US005621130A

United States Patent [19]

Ando et al.

[11] Patent Number: 5,621,130

[45] Date of Patent: Apr. 15, 1997

[54] ELECTROPHOTOGRAPHIC PHOTOSENSITIVE MEMBER, ELETROPHOTOGRAPHIC APPARATUS AND APPARATUS UNIT INCLUDING THE PHOTOSENSITIVE MEMBER

[75] Inventors: Wataru Ando; Takeshi Akasaka, both of Tsukuba; Shigeru Nagase, Yokohama; Kaoru Kobayashi, Yokohama; Hajime Miyazaki, Yokohama, all of Japan

[73] Assignee: Canon Kabushiki Kaisha, Tokyo, Japan

[21] Appl. No.: 141,630

[22] Filed: Oct. 27, 1993

[30] Foreign Application Priority Data

Oct. 22, 1993 [JP] Japan .................................... 5-264717

[51] Int. Cl.[6] ................................ C07F 7/08; C07F 7/18

[52] U.S. Cl. ................................ 556/465; 556/9; 556/12; 556/406; 556/460; 556/461; 556/482; 204/157.64; 204/157.74

[58] Field of Search ................................ 556/465, 9, 12, 556/406, 460, 461, 482; 204/157.64, 157.74

[56] References Cited

U.S. PATENT DOCUMENTS

| | | | |
|---|---|---|---|
| 3,824,099 | 7/1974 | Champ et al. | 96/1.5 |
| 4,123,269 | 10/1978 | Von Hoene et al. | 96/1 PC |
| 4,150,987 | 4/1979 | Anderson et al. | 96/1.5 R |
| 4,859,556 | 8/1989 | Sasaki | 430/73 |
| 4,892,949 | 1/1990 | Sasaki | 546/98 |
| 5,178,980 | 1/1993 | Mort et al. | 430/58 |
| 5,386,048 | 1/1995 | West et al. | 556/465 X |

FOREIGN PATENT DOCUMENTS

| | | | |
|---|---|---|---|
| 52-4188 | 2/1977 | Japan | G03G 5/01 |
| 55-42063 | 3/1980 | Japan | G01M 7/00 |
| 55-42380 | 10/1980 | Japan | G03G 5/04 |
| 58-32372 | 2/1983 | Japan | H01M 6/16 |
| 58-198043 | 11/1983 | Japan | G03G 5/06 |
| 61-132955 | 6/1986 | Japan | G03G 5/06 |

OTHER PUBLICATIONS

Tebbe et al., "Multiple Reversible Chlorination of $C_{60}$", J. Am. Chem. Soc. 1991, vol. 113, No. 26, pp. 9900–9901.

Olah et al., "Chlorination and Bromination of Fullerenes . . . ", J. Am. Chem. Soc. 1991, vol. 113, No. 24, pp. 9385–9387.

Selig et al., "Fluorinated Fullerenes", J. Am. Chem. Soc. 1991, 113, 5475–5476.

Creegan et al., "Synthesis and Characterization of $C_{60}O$, . . . ", J. Am. Chem. Soc. 1992, 114, 1103–1105.

Wood et al., "Oxygen & Methylene Adducts of $C_{60}$ and $C_{70}$", J. Am. Chem. Soc. 1991, 113, 5907–5908.

Koefod et al., "Organometallic Chemistry with Buckminsterfullerene", J. Am. Chem. Soc. 1991, 113, 8957–8958.

Akasaka et al., "Reaction of $C_{60}$ with Silylene, the First Fullerene Silirane Derivative", J. Am. Chem. Soc., vol. 15, No. 4, 1993, pp. 1605–1606.

Suzuki et al., "Synthesis of m–Phenylene–and p–Phenylebis (phenyl–fulleroids:" J. Am. Chem. Soc. 1992, 114, 7300–7301.

McEwen et al.,"$C_{60}$ as a Radical Sponge", J. Am. Chem. Soc. 1991, 114 4412–4414.

Fagan et al., "A Multiply–Substituted Buckminsterfullerene . . . ", J. Am. Chem. Soc. 1991, 113, 9408–9409.

Krusic et al., "Electron Spin Resonance Study . . . ", J. Am. Chem. Soc. 1991, 113, 6274–6275.

Bausch et al., "Diamagnetic Polyanions of the $C_{60}$ and $C_{70}$ Fullerenes . . . ", J. Am. Chem. Soc. 1991, 113, 3205–3206.

Hawkins et al., "2D Nuclear Magnetic Resonance Analysis of Osmylated $C_{60}$", J. Am. Chem. Soc. 1991, 113, 3205–3206.

Tebe et al., "Synthesis and single–Crystal X–ray Structure . . . ", Science, vol. 256, 1992, pp. 822–825.

Krusic et al., "Radical Reactions of $C_{60}$", Science, vol. 254, pp. 1183–1185, Nov. 1991.

Hawkins et al., "Crystal Structure of Osymlated $C_{60}$: . . . ", Science, vol. 252, pp. 312–313 (1991).

Fagan et al., "Metal Complexes of Buckminsterfullerene ($C_{60}$)", Acc. Chem. Res. 1992, 25, 134–142.

F. Wudl, "The Chemical Properties of Buckminsterfullerene ($C_{60}$) . . . ", Acc. of Chem. Res. 1992, 25, 157–161.

J. W. Hawkins, "Osmylation of $C_{60}$: Proof . . . ", Acc. Chem. Res., 1992, 25, 150–156.

Arbogast et al., "Photophysical Properties of $C_{60}$", J. Phys. Chem. 1991, 95, 11–12.

Haufler et al., "Efficient Production of $C_{60}$ . . . ", J. Phys. Chem., 1990, 94, 8634–8636.

(List continued on next page.)

*Primary Examiner*—Paul F. Shaver

*Attorney, Agent, or Firm*—Fitzpatrick, Cella, Harper & Scinto

[57] ABSTRACT

A photosensitive member having stable electrophotographic characteristics can be constituted by an electroconductive support and a photosensitive layer disposed thereon and containing a novel fullerene compound having an organosilicon group as a charge-transporting substance. The fullerene compound may preferably have a polyhedral structure, particularly that of Buckminsterfullerene ($C_{60}$) and be represented by the formula: $C_{60}(A)_n$ . . . (2), wherein A denotes an organosilicon group represented by the formula:

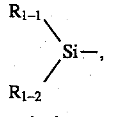

(1)

(wherein $R_{1-1}$ and $R_{1-2}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, a halogen atom, or a group constituting a substituted or unsubstituted ring by a mutual combination of $R_{1-1}$ and $R_{1-2}$ together with the Si atom in the formula); and n is an integer of 1 to 5, and a plurality of A in the case of n being two or larger can be the same or different with each other.

15 Claims, 23 Drawing Sheets

OTHER PUBLICATIONS

Elemes et al., "Reaction of $C_{60}$ with Dimethyldioxirane–. . . ", Angew. Chem. Int. Ed. Engl., 31, No. 3 (1992), 351–353.

Hirsch et al., "Globe–Trotting Hydrogen on the Surface . . . ", Angew. Chem. Int. Ed. Engl. 30, (1991), 10, 1309–1310.

Morton et al., "Electron Paramagnetic Resonance Spectra . . . ", J. chem. Soc. Perkin Trans. 2 (1992), 1425–1428.

Kalsbeck et al., "Electrochemical Reduction of Fullerenes . . . ", J. Electroanal Chem. 314 (1991), 363–370.

Wudl et al., "Survey of Chemical Reaction of $C_{60}$ . . . ", ACS Symposium Series, Fullerenes, ISSN 0097–6156, 481(1992) Chap. 11, pp. 161–174.

Birkett et al., "Preparation and Characterization of $C_{60}Br_6$ and $C_{60}Br_8$" Nature, vol. 357, Jun. 1992, 480–481.

Halloway et al., "Fluorination of Buckminsterfullerene", J. Chem. Soc., Chem. Comm. Nio. 13, Jul. 1991, 966–969.

Hawkins et al., "Organic Chemistry of $C_{60}$ . . . ", J. Org. Chem. 1990, 55, 6250–6252.

ELECTROPHOTOGRAPHIC PHOTOSENSITIVE MEMBER, ELETROPHOTOGRAPHIC APPARATUS AND APPARATUS UNIT INCLUDING THE PHOTOSENSITIVE MEMBER

FIELD OF THE INVENTION AND RELATED ART

The present invention relates to an electrophotographic photosensitive member, particularly an electrophotographic photosensitive member having a photosensitive layer containing a fullerene compound of a specific structure. The present invention further relates to an electrophotographic apparatus and an apparatus unit including the electrophotographic photosensitive member. The present invention also relates to the fullerene compound.

Electrophotographic photosensitive members using an organic photoconductive substance have advantages, such as a very high productivity, a low cost, and a free controllability of sensitive wavelength region by appropriate selection of dyes or pigments used, and accordingly have been widely studied. Particularly, owing to the development of a function separation-type photosensitive member including a laminate of a charge generation layer comprising a so-called charge generation substance such as an organic photoconductive dye or pigment and a charge transport layer comprising a charge transport substance, remarkable improvements have been made with respect to sensitivity and durability which had been considered as problems of conventional organic electrophotographic photosensitive members.

A charge transporting substance used for the above purposes is required to be (1) stable against light and heat, (2) stable against ozone, NOx, nitric acid, etc., generated by corona discharge, (3) having a high charge-transporting ability, and a good mutual solubility with an organic solvent and a binding agent. There have been known charge transporting substances, inclusive of, e.g., pyrazoline compounds as disclosed in Japanese Patent Publication (JP-B) 52-4188, hydrazone compounds as disclosed in JP-B 55-42380 and Japanese Laid-Open Patent Application (JP-A) 55-42063, triphenylamine compounds as disclosed in JP-B 58-32372 and JP-A 61-132955, and stilbene compounds as disclosed in JP-A 58-198043. Further, U.S. Pat. No. 5,178,980 has disclosed an electrophotographic photosensitive member using a fullerene compound as a charge transporting substance.

Fullerenes have been known as a novel class of carbon allotropes as represented by Buckminsterfullerene ($C_{60}$), have various interesting physical and chemical properties attributable to a special and unique molecular structure thereof and therefore constitute a group of substances as very interesting novel carbon substances. Particularly, since the invention of a method for mass synthesis of $C_{60}$ by W. Kraetchemer, et al (Nature, 1990, 347,345), there have been made extensive studies on the chemical reactivity of $C_{60}$.

As an example of chemical reaction of $C_{60}$, reactions of $C_{60}$ with nucleophilic agents have been reported by F. Wudl et al., Synthesis, Properties, and Chemistry of Large Carbon Clusters; Hammond, G. S. Kuck, V. J. Ed.; American Chemical Society: Washington D.C., 1882: P161, and by A. Hirsh, et. al., Angew, Chem. Int. Ed. Engl., 1991, 30, 1309. Further, the reactions with radicals have been reported by P. J. Krusic, et al, Science, 1991, 254, 1183. J. Am. Chem. Soc., 1991, 113, 6274; by J. Morton, J. Chem. Soc., Perkin Trans. 2, 1992, 1524; by D. A. Loy, et. al, J. Am. Chem. Soc., 1992, 114, 3977; and by L. N. McEven, et al, J. Am. Chem. Soc., 1992, 114, 4412. The reactions with reducing agents have been reported by R. E. Haufler, et al, J. Phys. Chem., 1990, 94, 8634; and by J. W. Bausch, J. Am. Chem. Soc., 1991, 113, 3205. The reactions with dienes and 1,3-dipoles have been reported by F. Wudl, et al, Synthesis, Properties, and Chemistry of Large Carbon Clusters; Hammond, G. S. Kuck, V. J. Ed.; American Chemical Society Washington, D.C., 1992: p161; Science, 1991, 254, 1186, J. Am. Chem. Soc., 1992, 114, 7300, J. Am. Chem. Soc., 1992, 114, 7300, J. Am. Chem. Soc., 1992, 114, 7301; Acc. Chem. Res. 1992, 25, 157; and by A. Hirsch, et al, Angew, Chem., Int. Ed. Engl. 1991, 30, 1309.

The reactions with 0-valent transition metal reagents have been reported by J. M. Hawkins, et al., J. Org. Chem., 1990, 55, 6250; Science 1991, 252, 312, J. Am. Chem. Soc., 1991, 113, 7770, Acc. Chem. Res. 1992, 25, 150; by P. J. Fagan, et al., Science 1991, 252, 1160: J. Am. Chem. Soc., 1991, 113, 9408; Acc. Chem. Res. 1992, 25, 134; and by R. S. Koefod, et al, J. Am. Chem., 1991, 113, 8957. The reactions with oxygen atoms have been reported by J. W. Arbogast, et al, J. Phys. Chem., 1991, 95, 11; by W. A. Kalsbeck, et al, J. Electroanal. Chem., 1991, 314, 363; by J. M. Wood, et al, J. Am. Chem. Soc., 1991, 113, 5907; by K. M. Greegan, et al, J. Am. Chem. Soc., 1992, 114, 1103; and by Y. Elemes, et al, Angew. Chem., Inst. Ed. Engl, 1992, 31, 351.

The reactions with electrophilic reagents have been reported by A. G. Avent et al, Nature, 1991, 335, 27; by J. A. H. Holloway, et al, J. Chem. Soc., Chem. Commun. 1991, 966; by H. Selig, et al, J. Am. Chem. Soc., 1991, 113, 5475; by G. A. Olah, et al, J. Am. Chem., Soc., 1991, 113, 9385 and 9387; by J. N. Tebbe, et al, J. Am. Chem. Soc. 1991, 113, 9900; Science, 1992, 56,822; and by P. R. Birkett, et al, Nature, 1992, 357,479.

Thus, many reactions have been reported recently, but there have been few reports of actual isolation and identification of purified products, i.e., only about the reaction products of $C_{60}$ with oxygen atom, products by addition of a diazo compound and C-60 metal complexes.

On the other hand, there are still being conducted studies on electrophotographic photosensitive members having a higher sensitivity and further excellent electrophotographic characteristics on repetitive use for image formation, so as to meet requirements of higher image qualities and further improved durability during such repetitive use.

SUMMARY OF THE INVENTION

An object of the present invention is to provide a fullerene compound of a novel structure.

Another object of the present invention is to provide a process for producing the fullerene compound.

An object of the present invention is to provide an electrophotographic photosensitive member having a photosensitive layer containing the fullerene compound.

Another object of the present invention is to provide an electrophotographic photosensitive member having a high sensitivity.

Still another object of the present invention is to provide an electrophotographic photosensitive member stably showing excellent potential characteristic even on repetitive use.

A further object of the present invention is to provide an electrophotographic apparatus and an apparatus unit including such an electrophotographic photosensitive member.

According to the present invention, there is provided a fullerene compound having an organosilicon group.

According to the present invention, there is also provided a process for producing a fullerene compound having an organosilicon compound, comprising reacting a starting fullerene compound with a silylene.

According to another aspect of the present invention, there is provided an electrophotographic photosensitive member, comprising: an electroconductive support and a photosensitive layer disposed on the electroconductive support, wherein said photosensitive layer contains a fullerene compound having an organosilicon group.

According to the present invention, there are further provided an electrophotographic apparatus and an apparatus unit including the above-mentioned electrophotographic photosensitive member.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 8A:
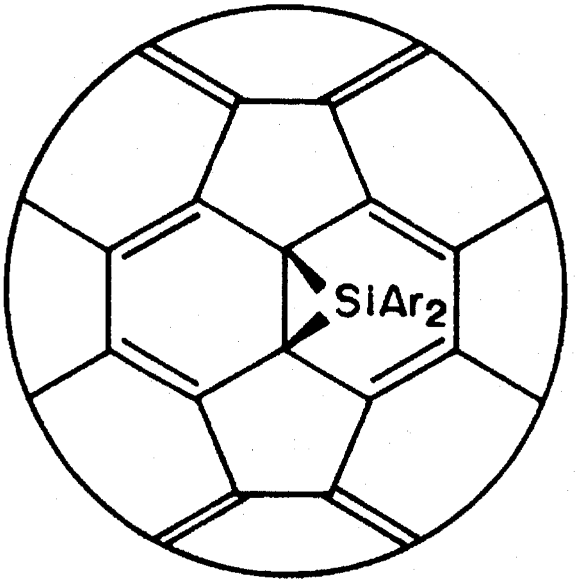
FIG. 8 shows a structure of a silirane-type adduct.
Figure 8B:
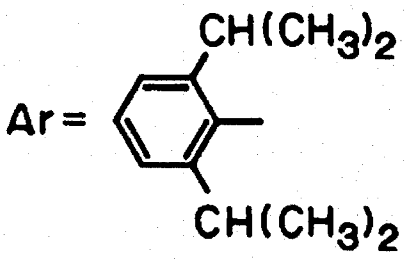

The fullerene compound according to the present invention may preferably include a fullerene structure unit showing a polyhedral structure, e.g., a soccer ball-like structure, particularly a Buckminsterfullerene ($C_{60}$) structure as shown in FIG. 8.

The organosilicon (or organic silicon) group in the fullerene compound used in the present invention may preferably be one represented by the following formula (1):

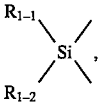
, (1)

wherein $R_{1-1}$ and $R_{1-2}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, a halogen atom, or a group constituting a substituted or unsubstituted ring by a mutual combination of $R_{1-1}$ and $R_{1-2}$ together with the Si atom in the formula. Accordingly, it is particularly preferred that the fullerene compound is one represented by the following formula (2):

$$C_{60}-(A)_n, \quad (2)$$

wherein denotes an organosilicon group represented by the formula (1), n is an integer of 1 to 5, and a plurality of A in the case of n being two or larger can be the same or different with each other.

Regarding the groups $R_{1-1}$ and $R_{1-2}$ in the formula (1), examples of the alkyl group may include methyl, ethyl, propyl, isopropyl and butyl; examples of the aryl group may include phenyl, naphthyl and anthranyl; examples of the alkoxy group may include methoxy, ethoxy and butoxy; examples of the silyl group may include trimethylsilyl and triphenyl silyl; examples of the germyl group may include trimethylgermyl and triphenylgermyl; and the halogen atom may for example be fluorine, chlorine, or bromine. Further examples of the ring structure constituted by a combination of $R_{1-1}$ and $R_{1-2}$ include those of silacyclopentane and silacyclohexane. These groups can have a substituent, examples of which may include: aryl groups, such as phenyl, naphthyl, and anthranyl; alkyl groups, such as methyl, ethyl, propyl, isopropyl and butyl; alkoxy groups, such as methoxy, ethoxy and butoxy; silyl groups, such as trimethylsilyl and triphenylsilyl; germyl groups, such as trimethylgermyl and triphenylgermyl; and halogen atoms, such as fluorine, chlorine and bromine.

The fullerene compound having an organosilicon group according to the present invention may be obtained by reacting a starting fullerene compound with a silylene to introduce or add an organosilicon group. For example, the fullerene compound represented by the above formula (2) may be synthesized by reacting $C_{60}$ with a silylene represented by the following formula (3):

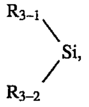

(3)

wherein $R_{3-1}$ and $R_{3-2}$ independently denote groups similar to those of $R_{1-1}$ and $R_{1-2}$. The silylene may be obtained through any appropriate reaction, preferred examples of which may include photodecomposition, thermal decomposition or reduction of a silane compound, and photodecomposition or thermal decomposition of a 7-silanorbornadiene derivative. Preferred examples of the silane compound may include those represented by formulae (4), (5) and (6) shown below, and preferred examples of the 7-silanorbornadiene derivative may preferably include those represented by formula (7) below.

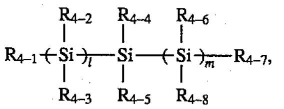

(4)

wherein $R_{4-1}$ to $R_{4-8}$ independently denote groups similar to those of $R_{1-1}$ and $R_{1-2}$, and l and m are independently 0 or an integer of at least 1 with the proviso that $l+m \geqq 1$.

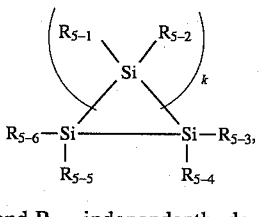

(5)

wherein $R_{5-1}$ and $R_{5-2}$ independently denote groups similar to those denoted by $R_{1-1}$ and $R_{1-2}$, and k is an integer of at least 1.

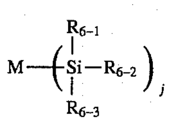

(6)

wherein M denotes a metal atom, $R_{6-1}$ to $R_{6-3}$ independently denote groups similar to those of $R_{1-1}$ and $R_{1-2}$, and j is an integer of 1–5.

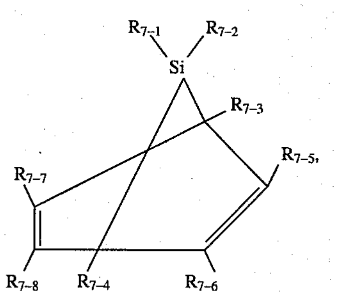

(7)

wherein $R_{7-1}$ and $R_{7-2}$ independently denote groups similar to those of $R_{1-1}$ and $R_{1-2}$, and $R_{7-3}$ and $R_{7-8}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, a substituted or unsubstituted ester group, a halogen atom, or a group constituting a substituted or unsubstituted ring by a mutual combination of $R_{7-5}$ and $R_{7-6}$ or $R_{7-7}$ and $R_{7-8}$.

In the above formulae, examples of the metal denoted by M may include mercury, zinc and aluminum; examples of the alkyl group, aryl group, alkoxy group, silyl group, germyl group and halogen atom denoted by $R_{7-3}$ to $R_{7-8}$ may include those of $R_{1-1}$ and $R_{1-2}$; examples of the ester group denoted by $R_{7-3}$ to $R_{7-8}$ may include methyl ester group and phenyl ester group; and examples of the ring constituted by the combination of $R_{7-5}$ and $R_{7-6}$, or $R_{7-7}$ and $R_{7-8}$ together with the carbon atoms in the formula (7) may include arene rings such as a benzene ring and a naphthalene ring. $R_{7-3}$-$R_{7-8}$ can have a substituent similar to those which $R_{1-1}$ and $R_{1-2}$ can have.

The photodecomposition of the silane compound or the silanorbornadiene derivative may for example be performed by placing a silane compound or a silanorbornadiene derivative subjected to dissolution in a solvent and freeze-degassing in a quartz reaction tube, followed by photoirradiation to form a silylene. Examples of the solvent may include: hydrocarbon solvents, such as pentane, hexane, and heptane; aromatic hydrocarbon solvents, such as benzene, toluene, xylene and mesitylene; and halogenated aromatic hydrocarbon solvents, such as chlorobenzene, dichlorobenzene and chloronaphthalene. Alcohols, such as methanol, ethanol and butanol can be used depending on conditions, while they can react with the silylene to reduce the yield thereof in some cases. Photoirradiation may be performed by using a light source of a low-pressure mercury lamp, a high-pressure mercury lamp, an ultra-high-pressure mercury lamp, a xenon lamp, and a blacklight. The generation of a silylene from a silane compound (particularly a polysilane) may be caused by cleavage of the Si—Si bond. In order to cause an effective cleavage of the bond, it is preferred to use ultraviolet rays at a wavelength of 320 nm or shorter. It is particularly preferred to use ultraviolet rays having a wavelength of 300 nm or shorter, further preferably 254 nm or shorter. Such wavelength rays may be emitted at a high efficiency by e.g., a low-pressure mercury lamp or a blacklight.

The silylene used in the present invention may be easily reactive with oxygen or moisture within air, so that it is preferred to use for the reaction a solvent which has been sufficiently purified and dehydrated. It is further preferred to effect the reaction in an evacuated atmosphere or in an atmosphere of a chemically stable gas, such as nitrogen or argon in order to increase the yield of the objective product and easily isolate the unstable compound.

The thermal decomposition of the silane compound or silanorbornadiene may be performed by using a solvent similar to the one used in the above-mentioned photodecomposition. After freeze-degassing in the same manner as in the case of photodecomposition, the thermal decomposition may be performed by heating the silane compound or silanorbornadiene derivative in an evacuated reaction tube at 100°–400° C. to generate a silylene.

In the case of reducing the silane compound, it is also possible to use an ether solvent, such as diethyl ether or tetrahydrofuran in addition to the above-mentioned solvents used for the photodecomposition or thermal decomposition. The reaction may be performed by reducing the silane compound with a metal, such as sodium or lithium, or an organometal reagent, such as lithium naphthalenide in an inert gas atmosphere of, e.g., argon or nitrogen to generate a silylene.

The silane compound or silanorbornadiene derivative for generating a silylene may be used in an amount of 0.9–30 mol. parts, preferably 0.9–10 mol parts per mol part of $C_{60}$. The generated silylene may be reacted in situ with $C_{60}$. The reaction may preferably be a quartz-made one showing a good transmittance with respect to ultraviolet rays in the case of the photodecomposition or a vessel of thermally stable glass having a softening point of at least 500° C., particularly pyrex glass or quartz glass having a softening point of at least 750° C., in the case of the thermal decomposition.

Hereinbelow, some preferred examples of the silane compound and silanorbornadiene are enumerated hereinbelow by chemical formulae, wherein a methyl group may be denoted by Me, and a phenyl group may be denoted by Ph or ϕ in some cases.

Polysilanes

P-1

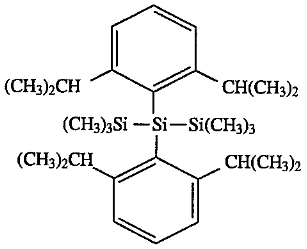

P-2

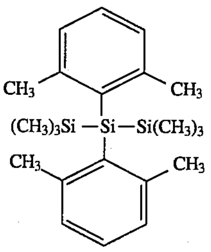

-continued

P-3

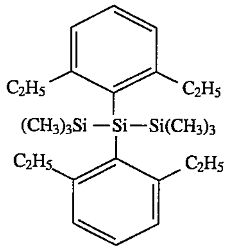

P-4

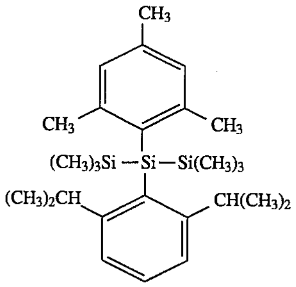

P-5

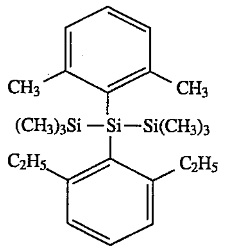

P-6

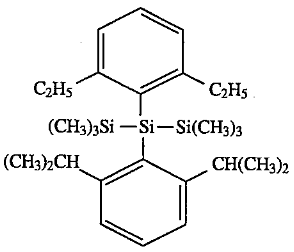

P-7

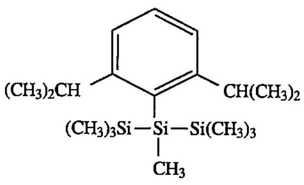

P-8

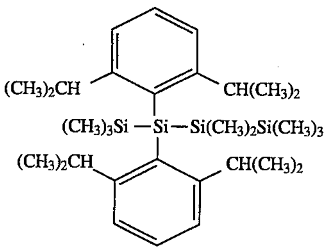

-continued
P-9
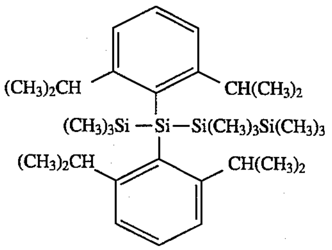
P-10
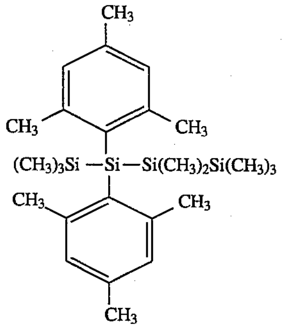
P-11
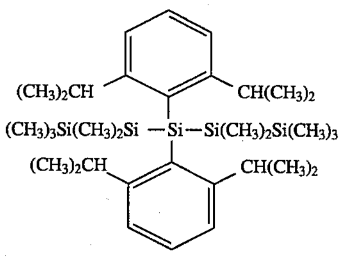
P-12
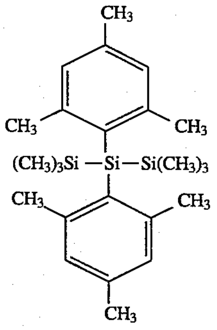
P-13
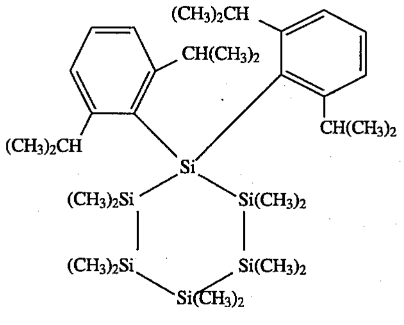
P-14
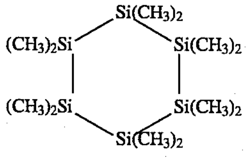
-continued
P-15
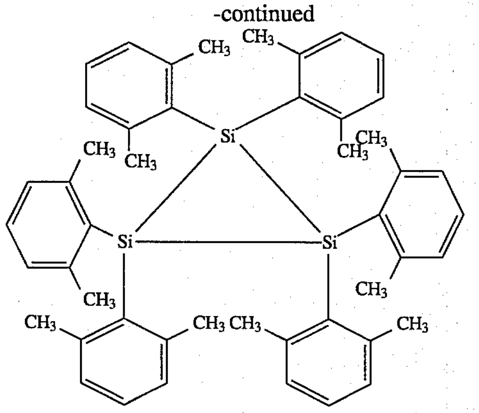
P-16
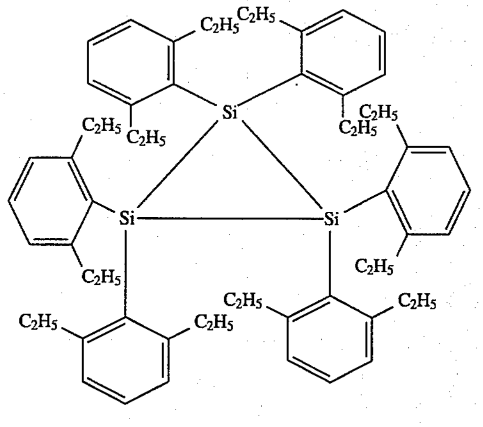
P-17
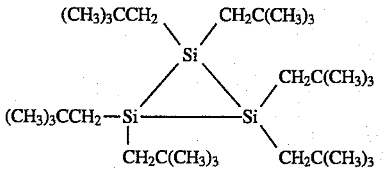
$(Me_3Si)_2SiBr_2$ P-18
$(Ph_3Si)_2SiBr_2$ P-19
$(Me_3Ge)_2SiBr_2$ P-20
$(Ph_3Ge)_2SiBr_2$ P-21
Silanes
$Me_3SiSiMe_3$ S-1
$Cl_3SiSiCl_3$ S-2
$F_3SiSiF_3$ S-3
$Hg(SiMe_3)_3$ S-4
$Al(SiMe_3)_3$ S-5
$Zn(SiPh_3)_2$ S-6
Silanorbornadienes
N-1
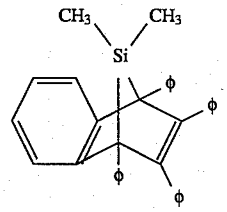

Figure 9A:
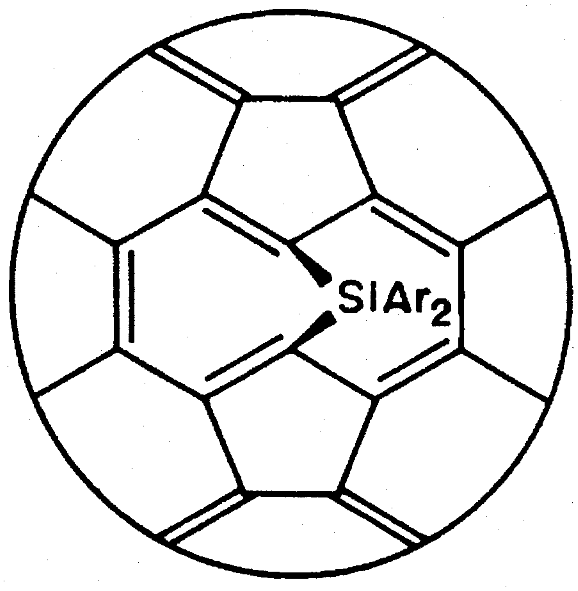
FIG. 9 shows a structure of an annulene-type adduct.
Figure 9B:
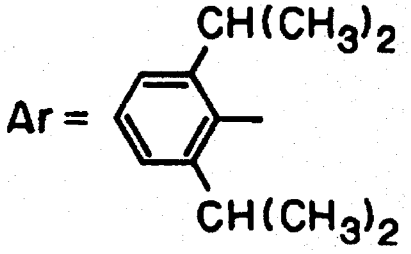
Figure 10:
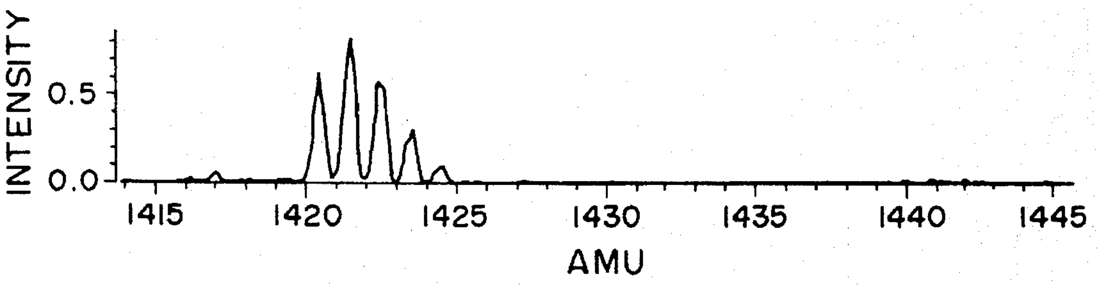
FIG. 10 shows an FAB mass spectrum of fullerene compound 2 according to the invention.
Figure 11:
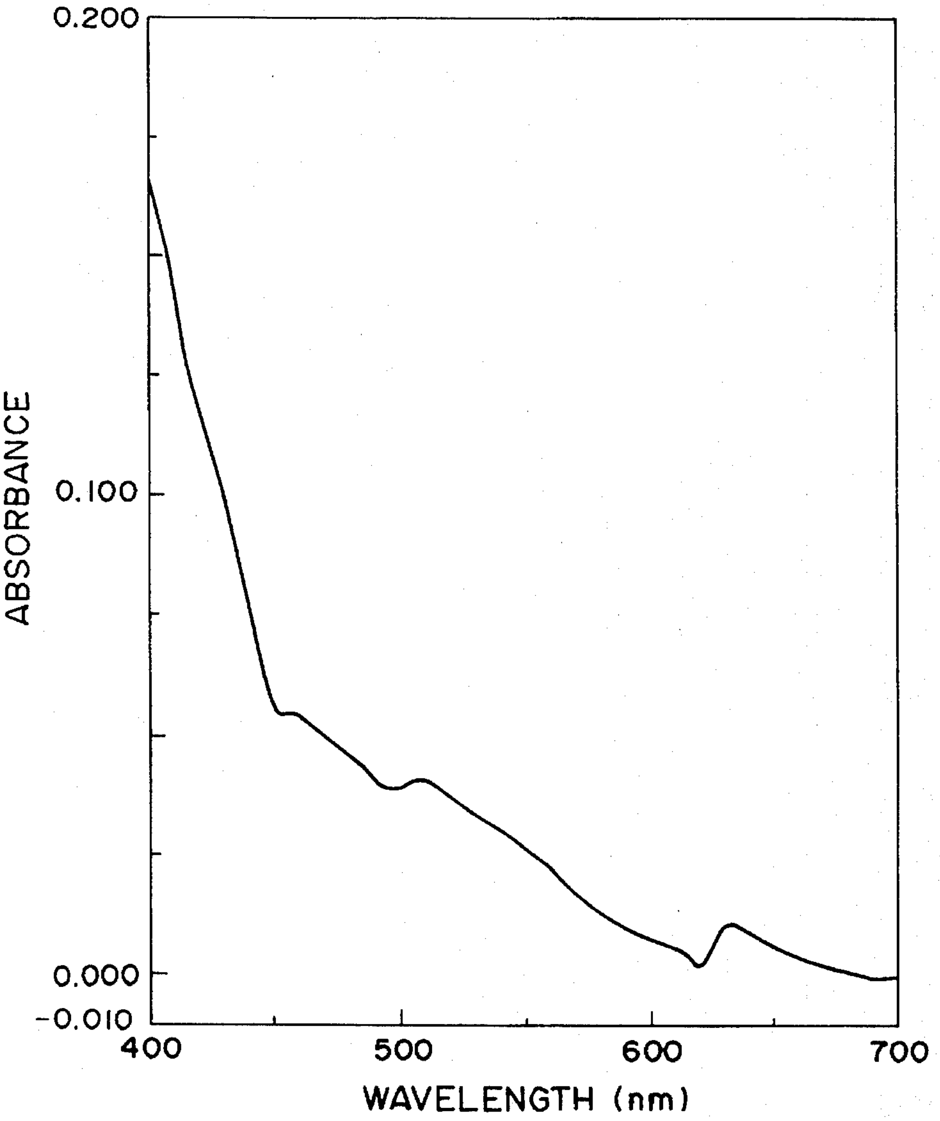
FIG. 11 shows a UV-VIS spectrum (in toluene) of fullerene compound 2 according to the invention.
Figure 12:
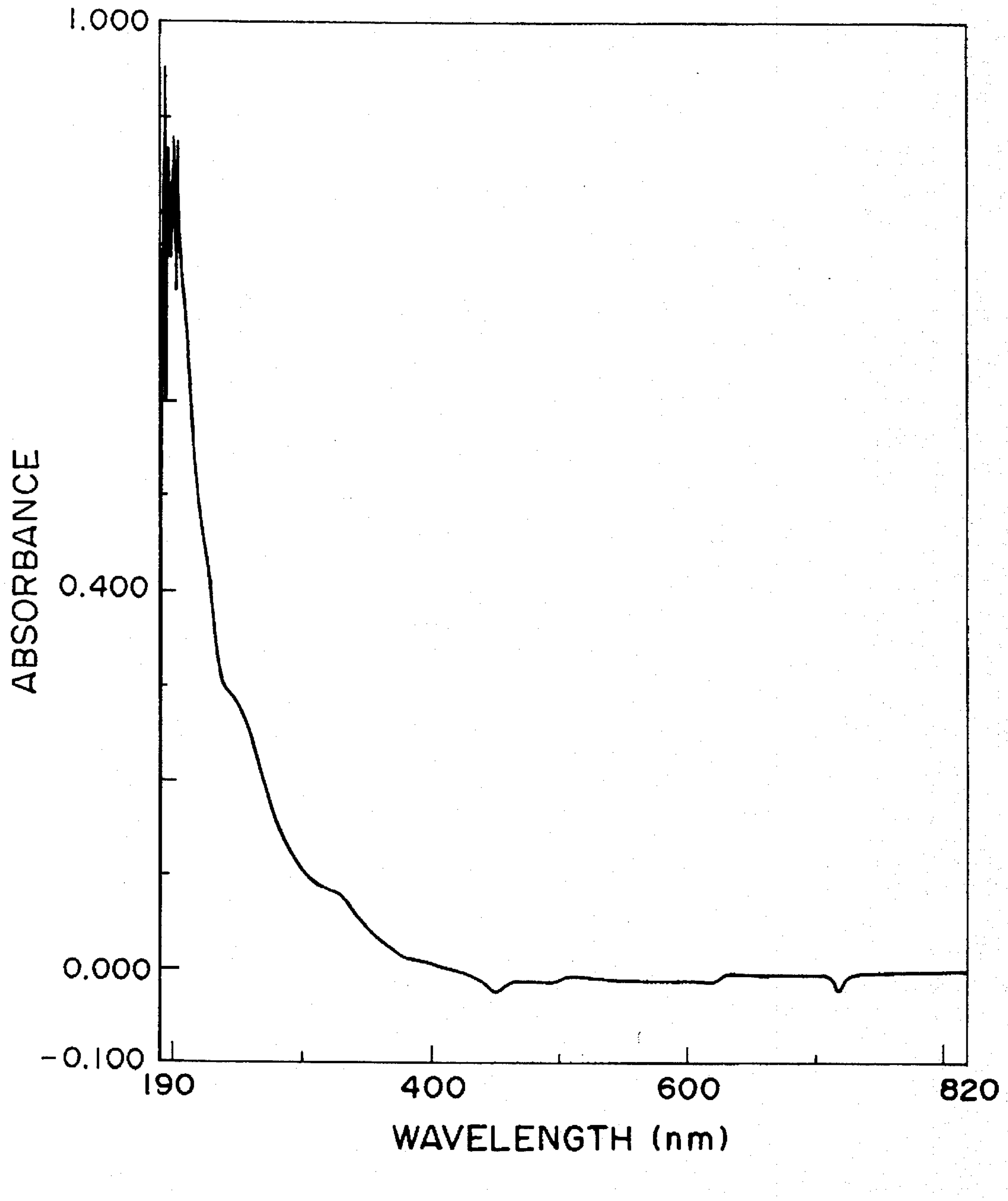
FIG. 12 shows a UV-VIS spectrum (in hexane) of fullerene compound 2 according to the invention.
Figure 13:
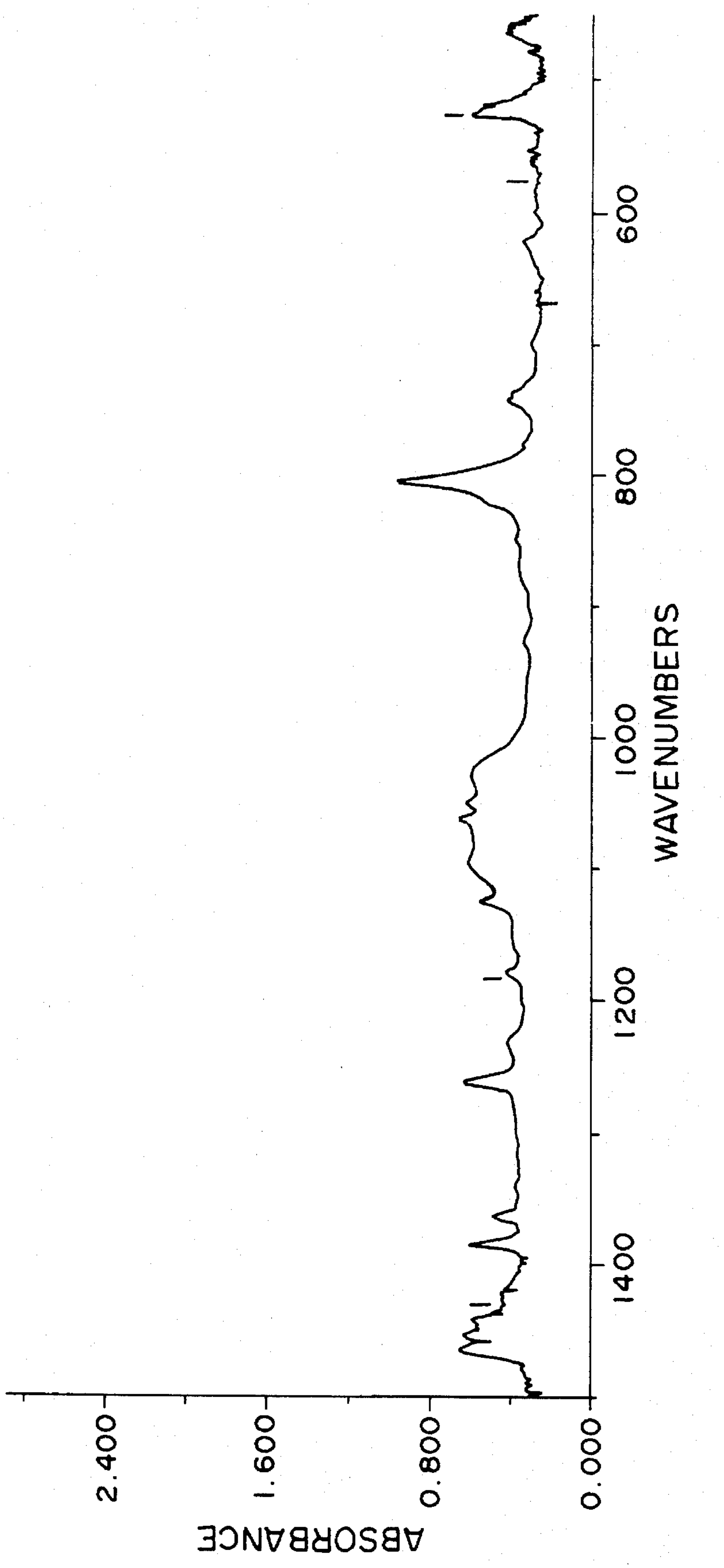
FIG. 13 shows an FT-IR spectrum (KBr pellet method) of fullerene compound 2 according to the invention.
Figure 14:
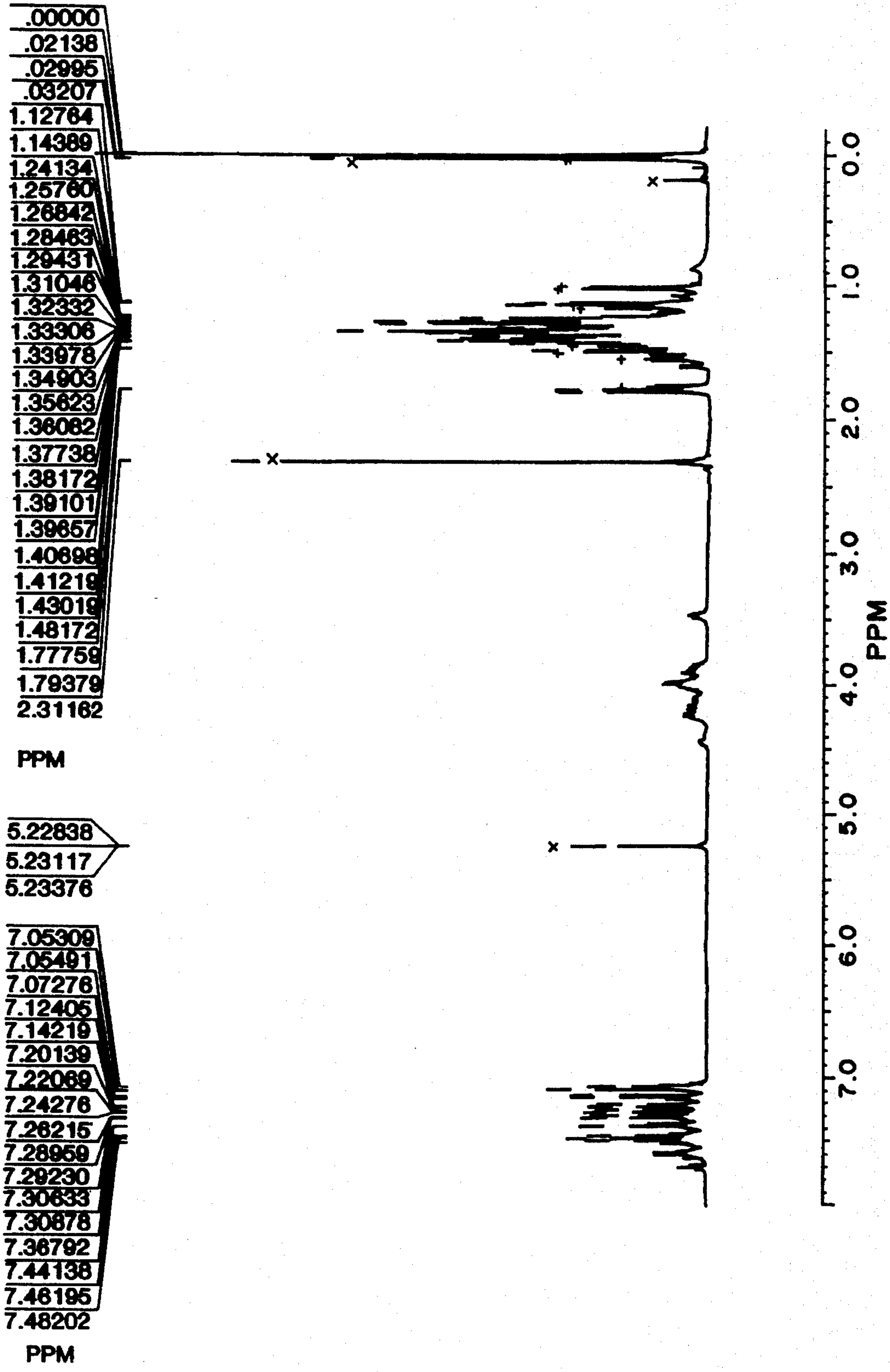
FIG. 14 shows a $^{1}$H- NMR spectrum (400 MHz) of fullerene compound 2 according to the invention.
Figure 15:
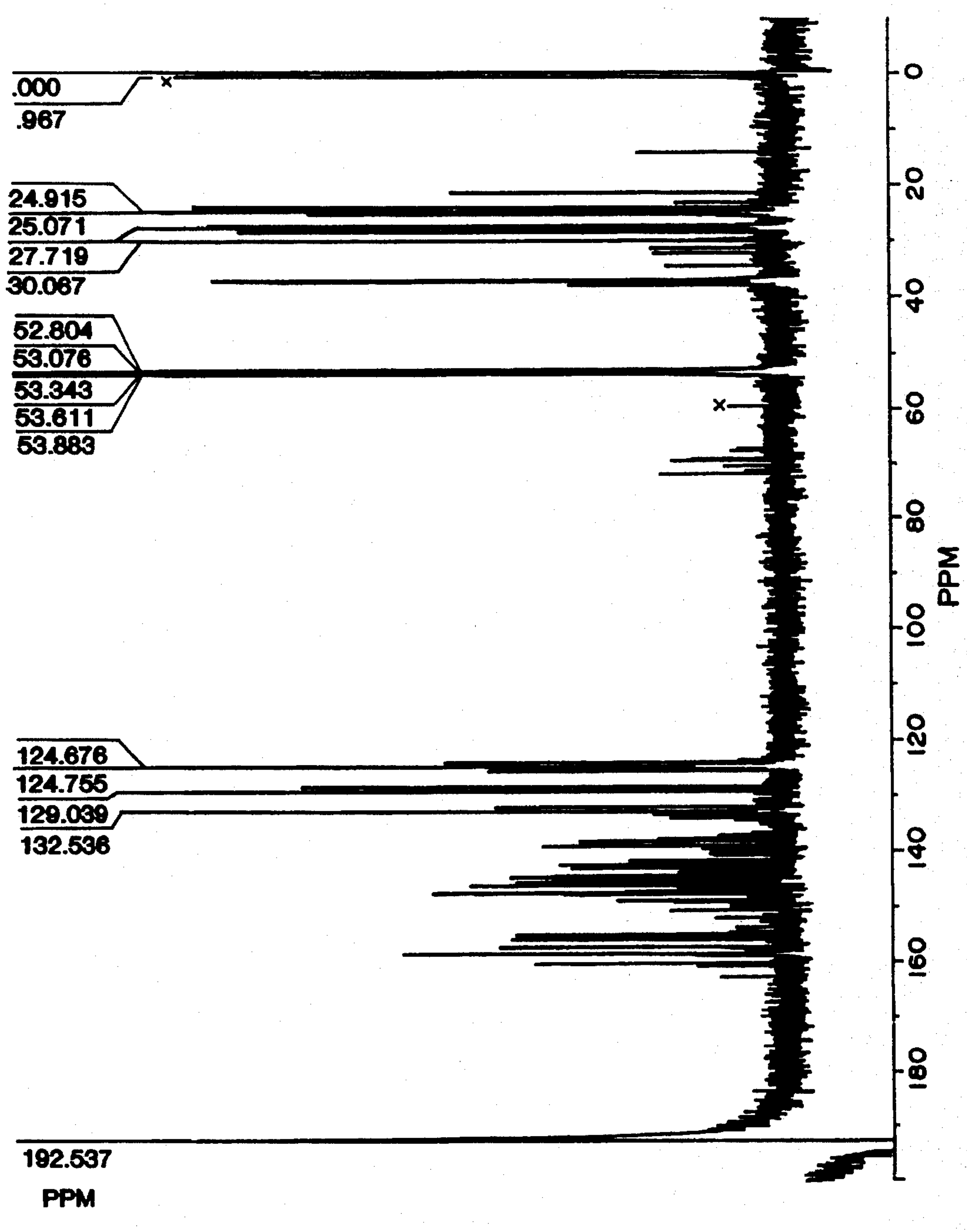
FIG. 15 shows a $^{13}$C- NMR spectrum (100 MHz) of fullerene compound 2 according to the invention.
Figure 16:
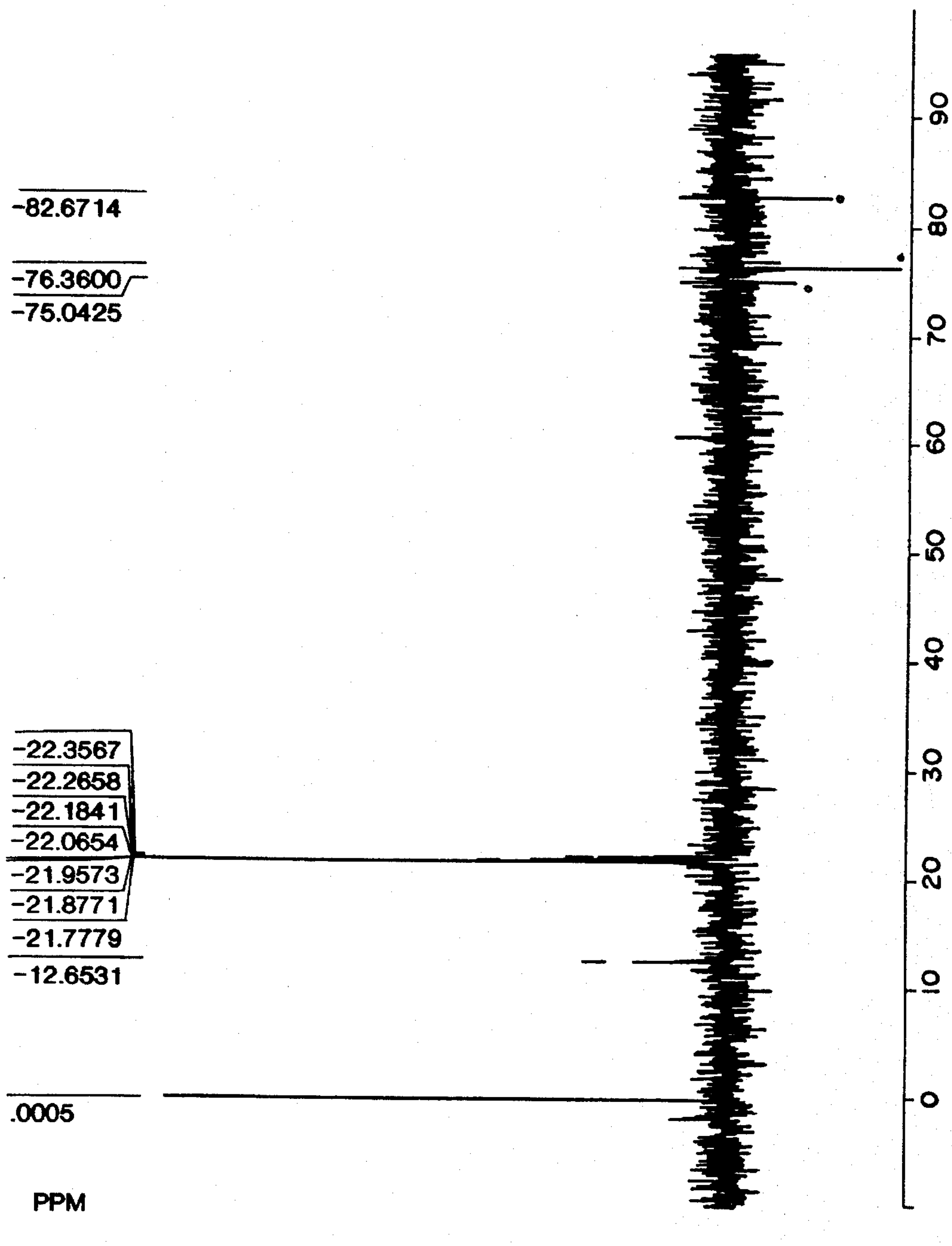
FIG. 16 shows a $^{29}$Si- NMR spectrum (79 MHz) of fullerene compound 2 according to the invention.
Figure 17:
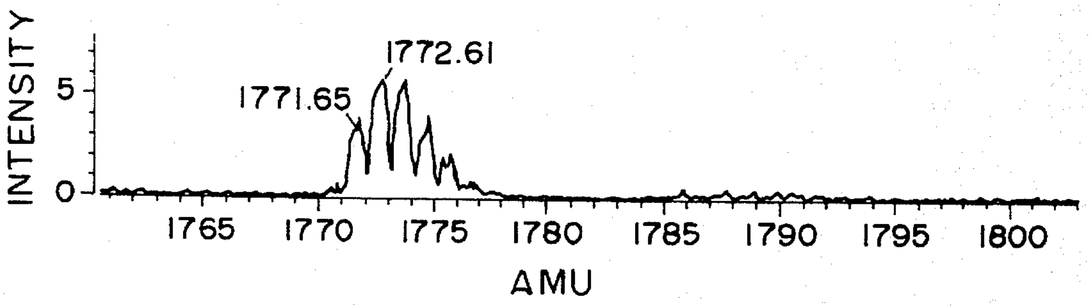
FIG. 17 shows an FAB mass spectrum of fullerene compound 3 according to the invention.
Figure 18:
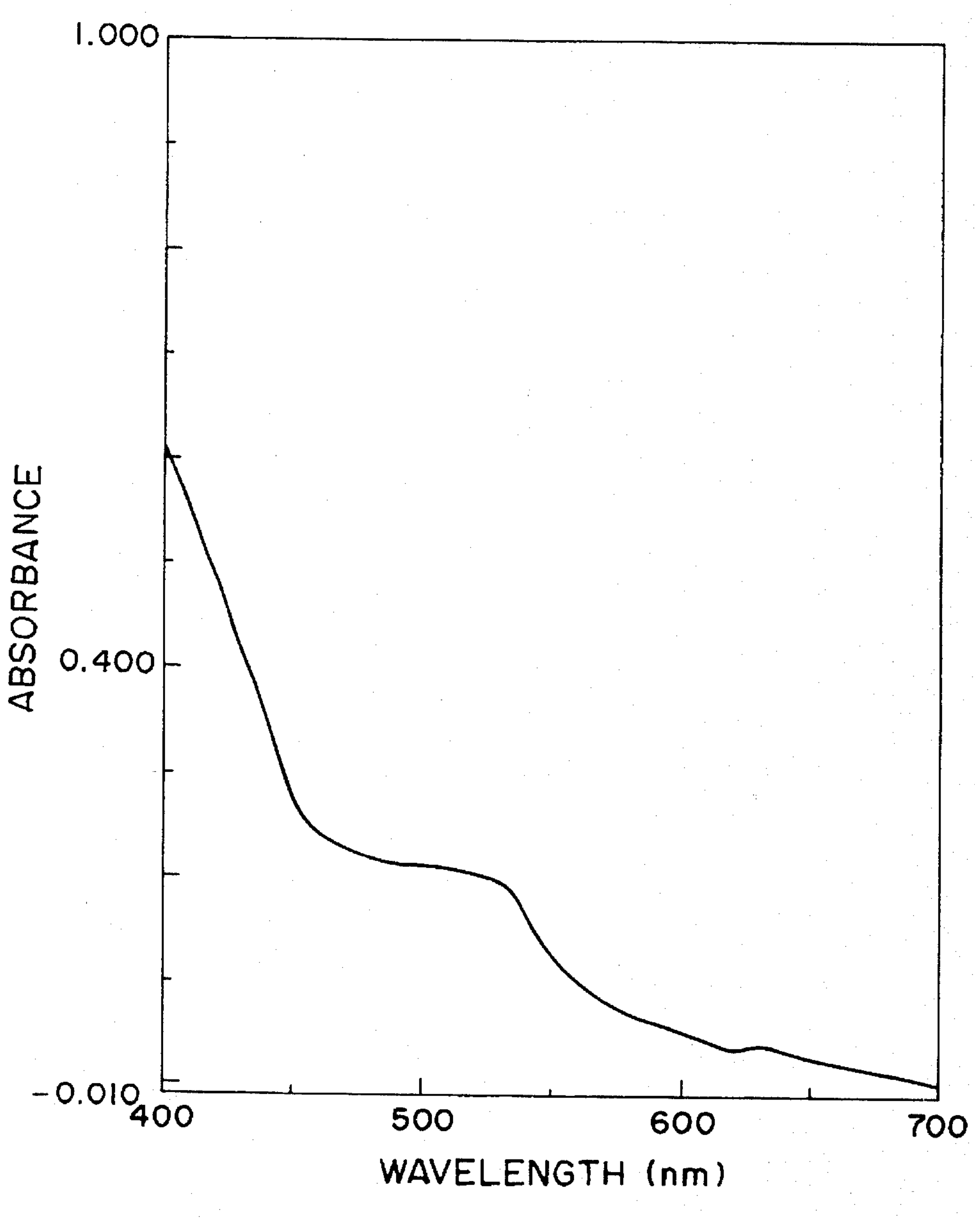
FIG. 18 shows a UV-VIS spectrum (in toluene) of fullerene compound 3 according to the invention.
Figure 19:
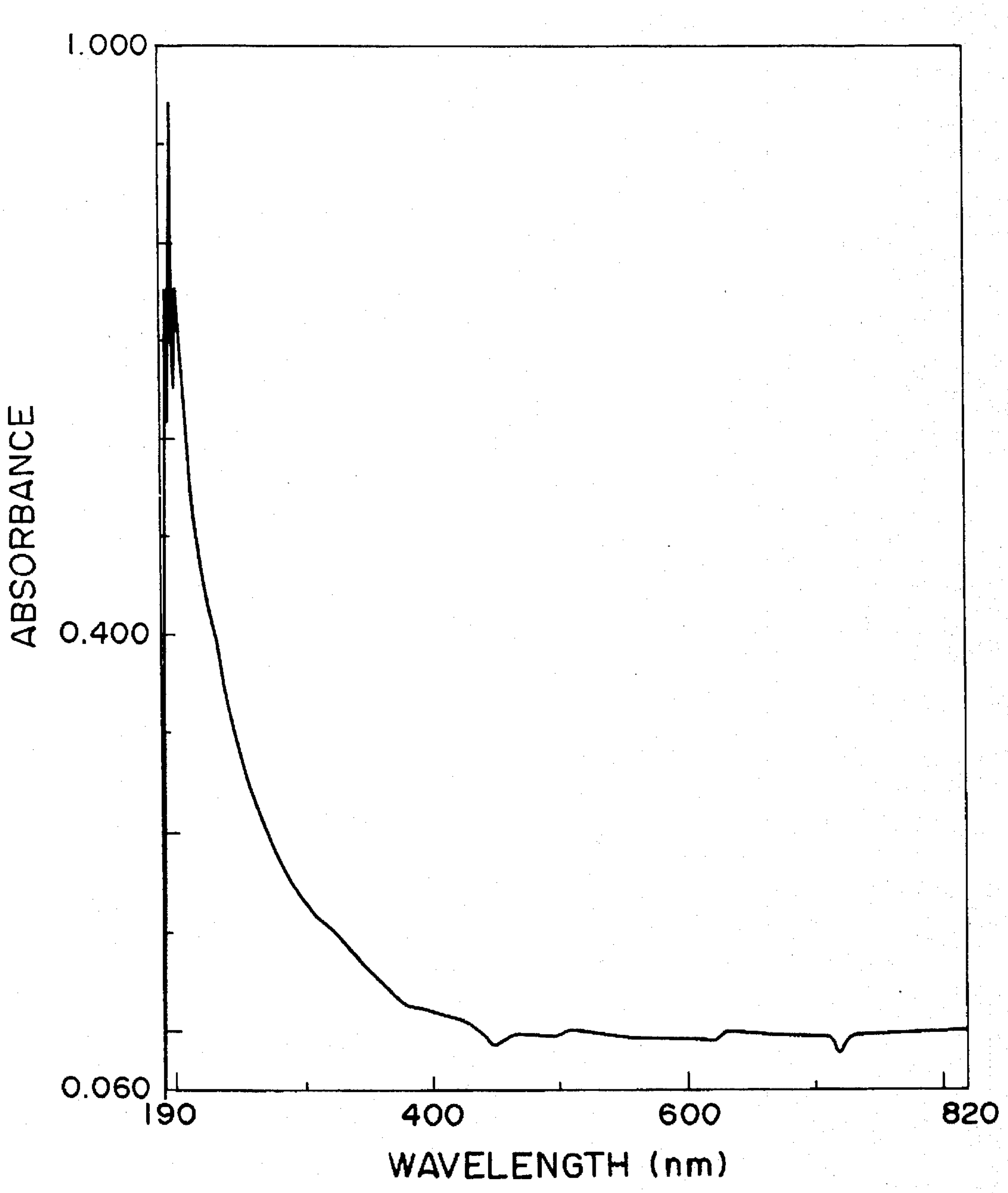
FIG. 19 shows a UV-VIS spectrum (in hexane) of fullerene compound 3 according to the invention.
Figure 20:
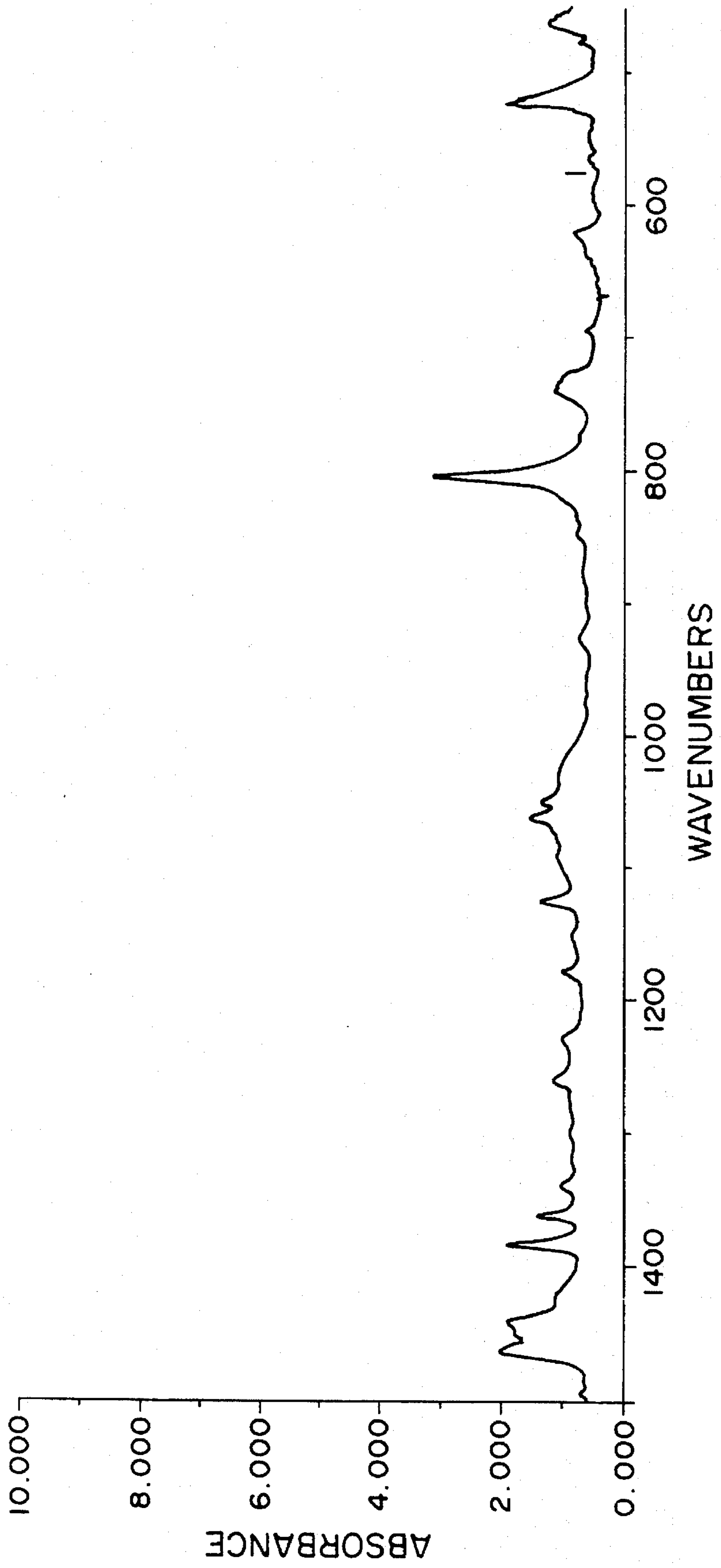
FIG. 20 shows an FT-IR spectrum (KBr pellet method) of fullerene compound 3 according to the invention.
Figure 21:
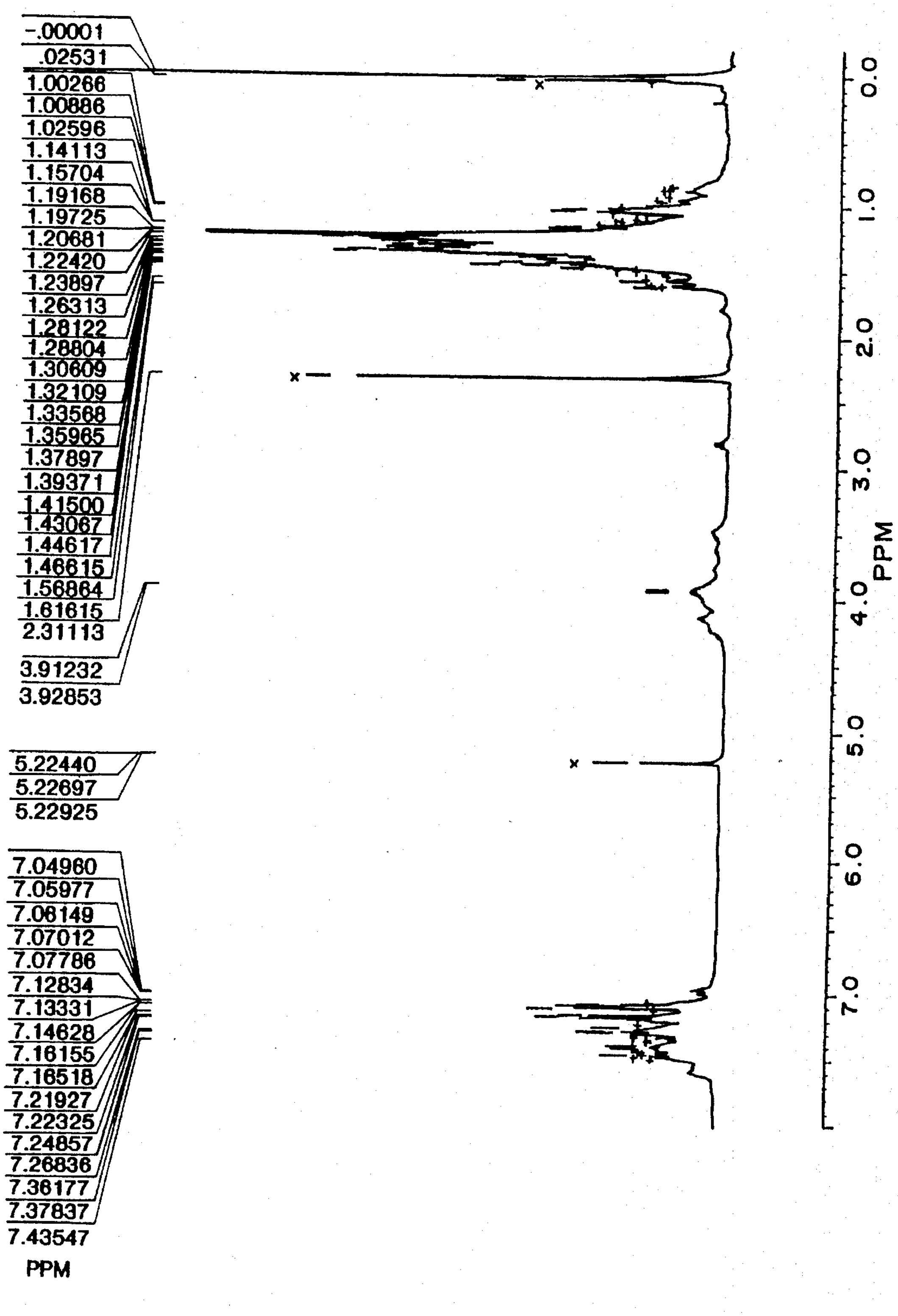
FIG. 21 shows a $^{1}$H- NMR spectrum (400, MHz) of fullerene compound 3 according to the invention.
Figure 22:
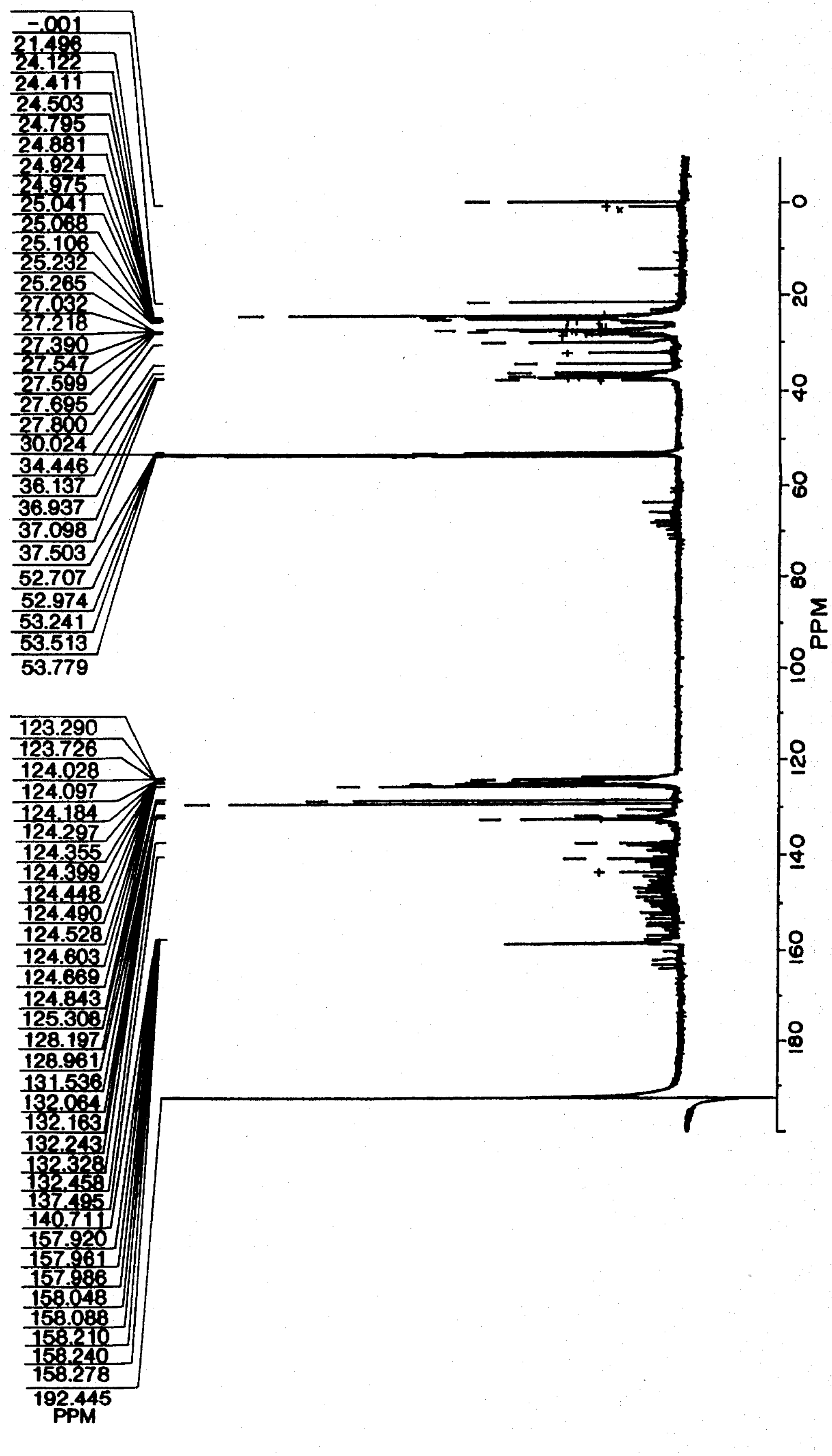
FIG. 22 shows a $^{13}$C- NMR spectrum (100 MHz) of fullerene compound 3 according to the invention.
Figure 23:
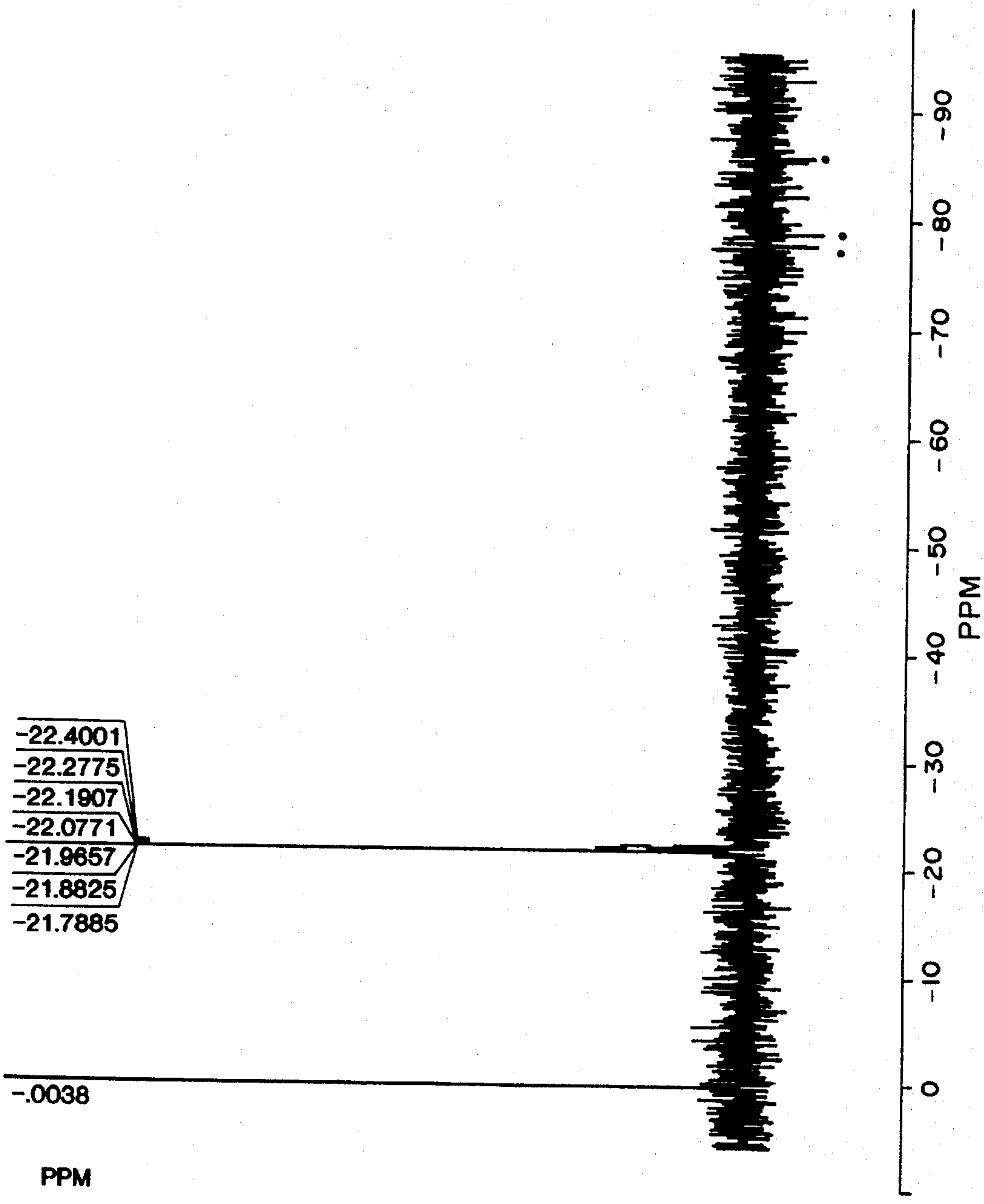
FIG. 23 shows a $^{29}$Si- NMR spectrum (79 MHz) of fullerene compound 3 according to the invention.
Figure 24:
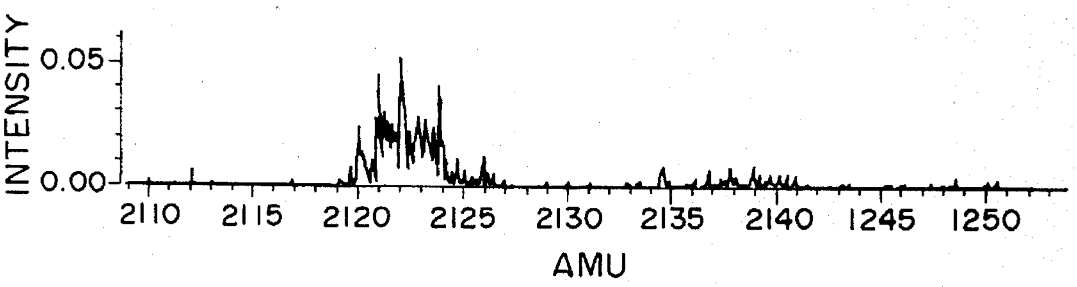
FIG. 24 shows an FAB mass spectrum of fullerene compound 4 according to the invention.
Figure 25:
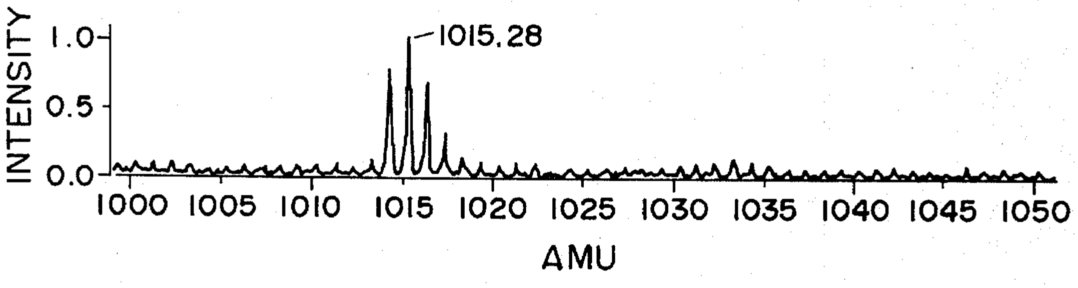
FIG. 25 shows an FAB mass spectrum of fullerene compound 5 according to the invention.
Figure 26:
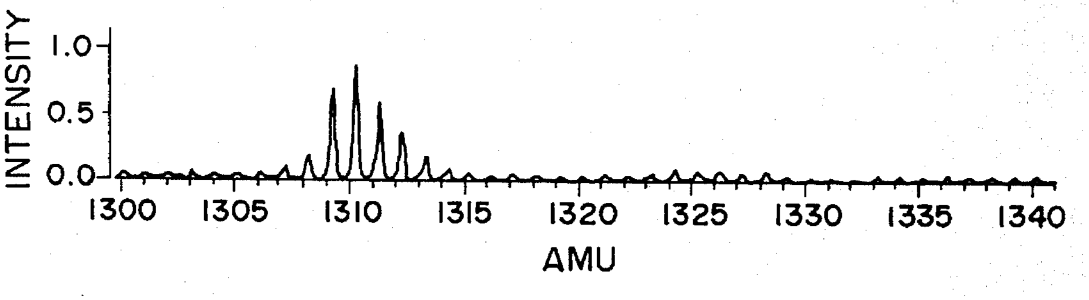
FIG. 26 shows an FAB mass spectrum of fullerene compound 6 according to the invention.
Figure 27:
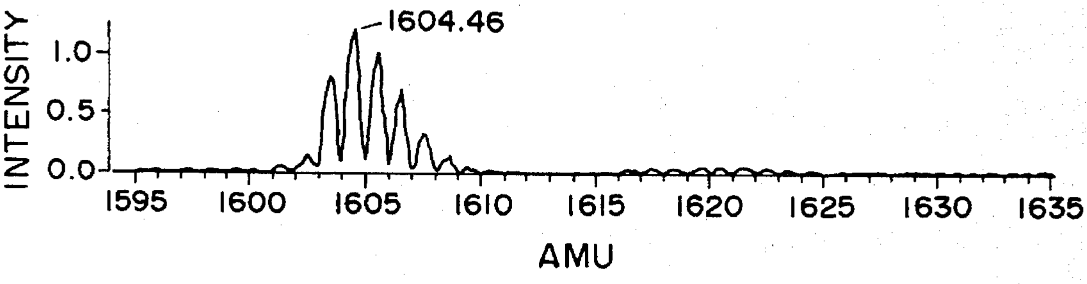
FIG. 27 shows an FAB mass spectrum of fullerene compound 7 according to the invention.
Figure 28:
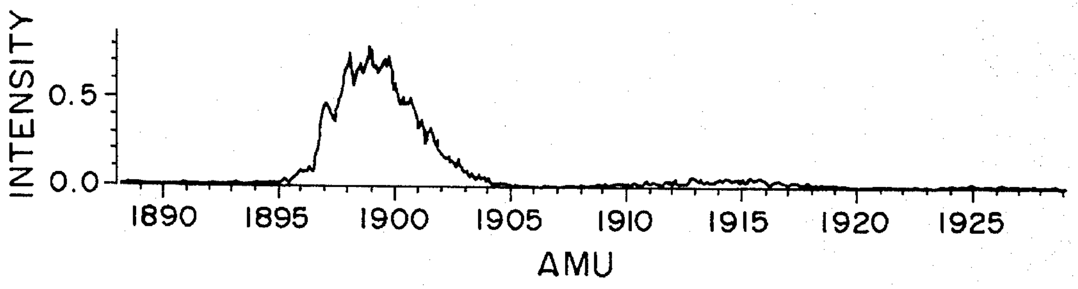
FIG. 28 shows an FAB mass spectrum of fullerene compound 8 according to the invention.
Figure 29:
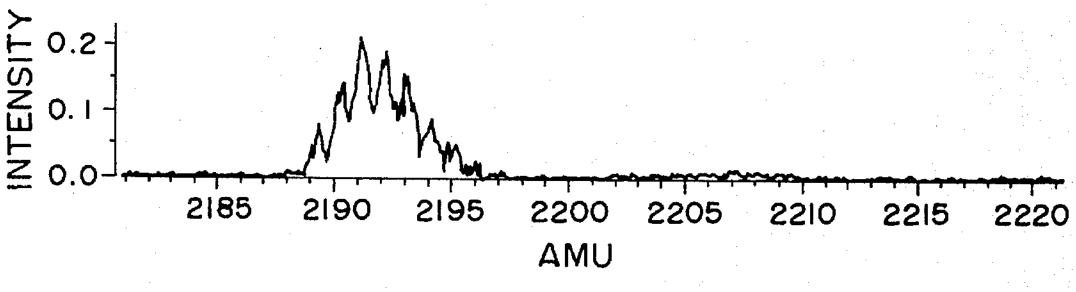
FIG. 29 shows an FAB mass spectrum of fullerene compound 9 according to the invention.
Figure 30:
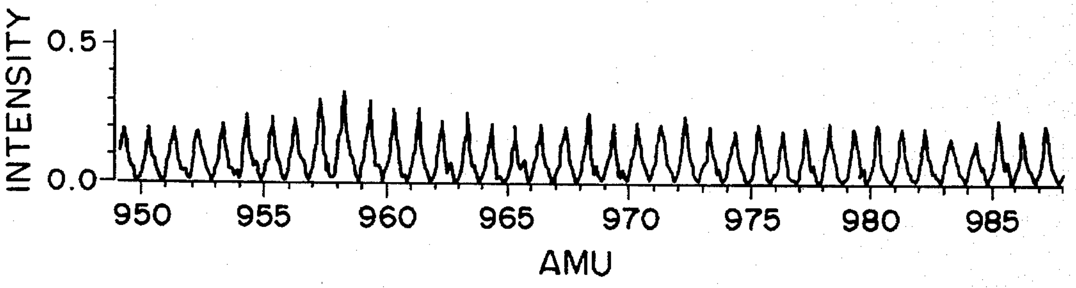
FIG. 30 shows an FAB mass spectrum of fullerene compound 10 according to the invention.
Figure 31:
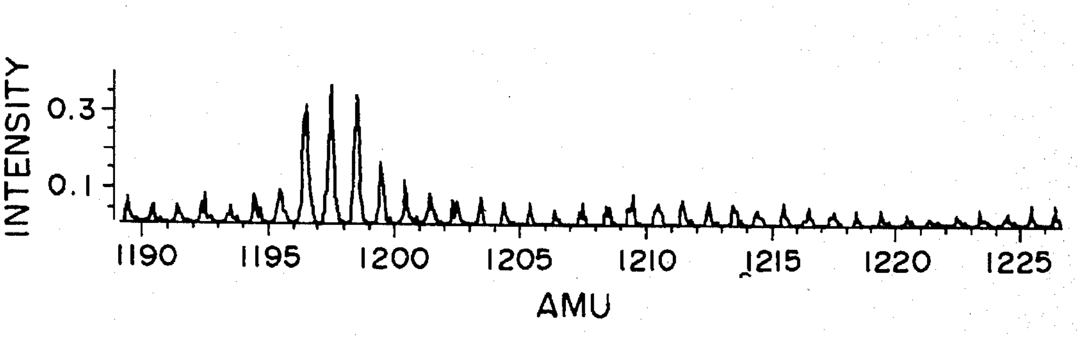
FIG. 31 shows an FAB mass spectrum of fullerene compound 11 according to the invention.
Figure 32:
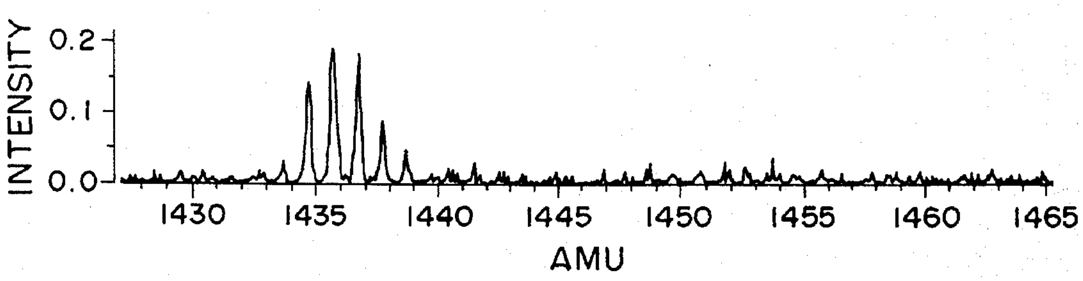
FIG. 32 shows an FAB mass spectrum of fullerene compound 12 according to the invention.
Figure 33:
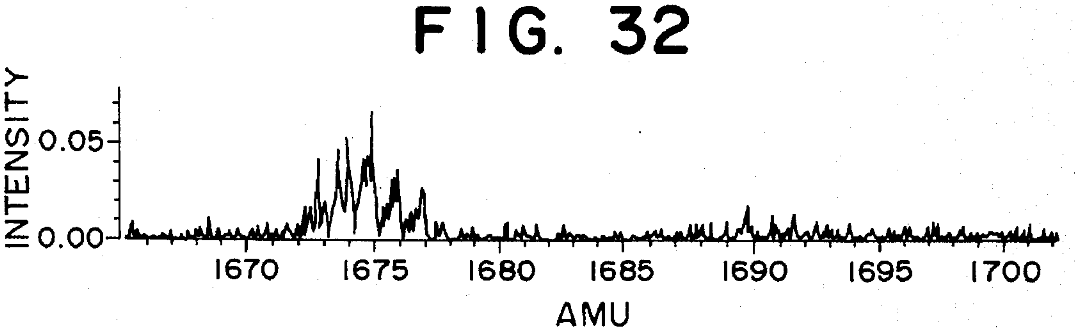
FIG. 33 shows an FAB mass spectrum of fullerene compound 13 according to the invention.
Figure 34:
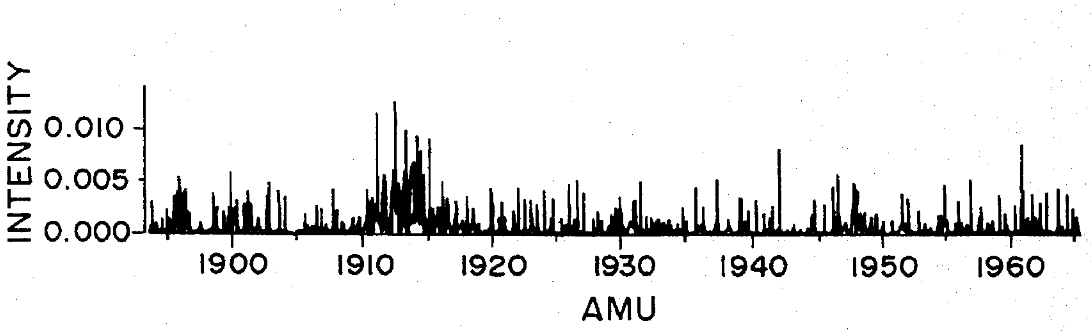
FIG. 34 shows an FAB mass spectrum of fullerene compound 14 according to the invention.

-continued
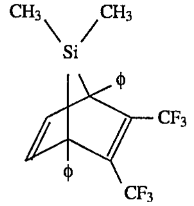
N-2
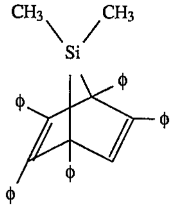
N-3
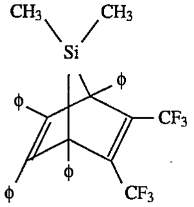
N-4
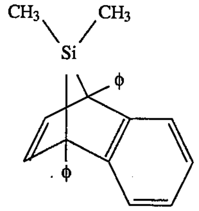
N-5
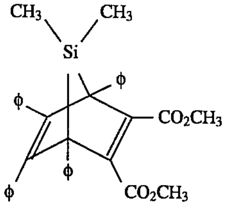
N-6
Hereinbelow, some examples of fullerene compounds according to the present invention are enumerated, but they are not exhaustive.
In the following examples while for convenience only a single bond is illustrated between the Si and $C_{60}$, there are, in fact, two single bonds between the Si and $C_{60}$ as shown in FIGS. 8 and 9.
Example Compound No.
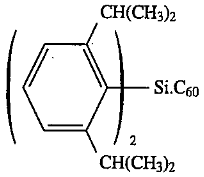
(1)
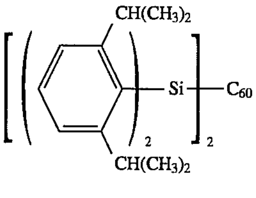
(2)
-continued
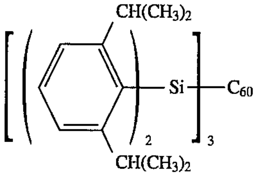
(3)
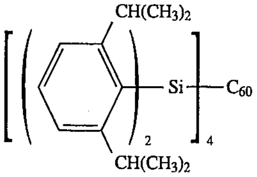
(4)
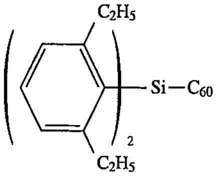
(5)
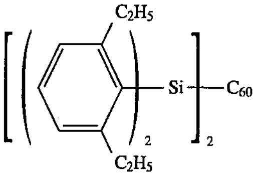
(6)
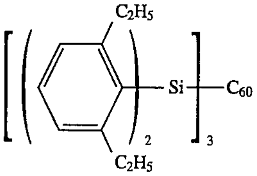
(7)
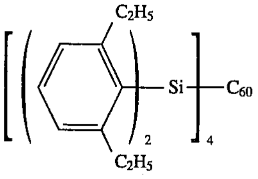
(8)
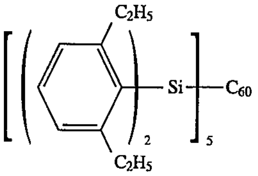
(9)
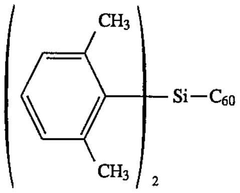
(10)
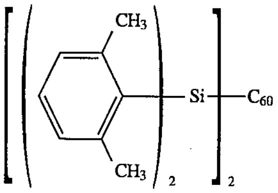
(11)

-continued (12)

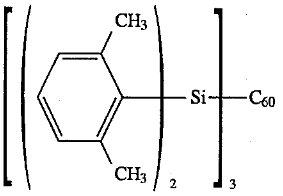

(13)

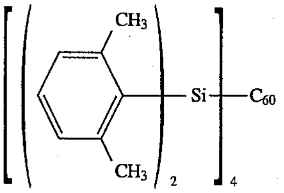

(14)

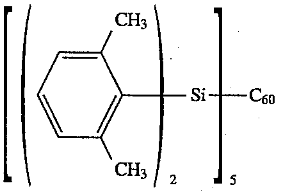

(15)

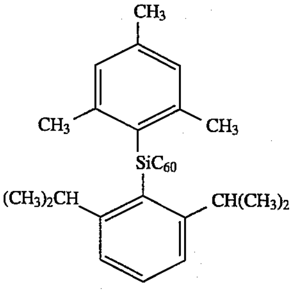

(16)

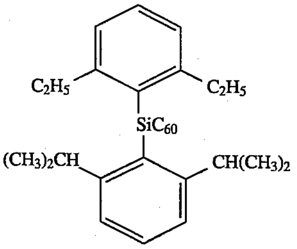

(17)

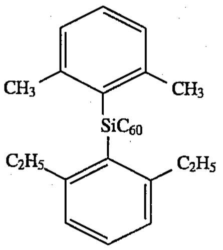

(18)

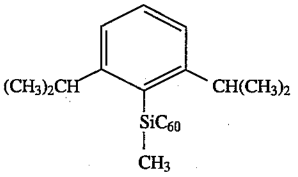

-continued (19)

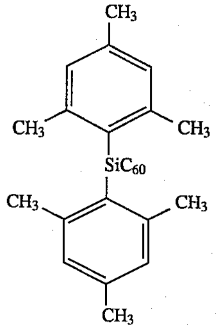

$(CH_3)_2SiC_{60}$ (20)

$(Ph_3Ge)_2SiC_{60}$ (21)

(22)

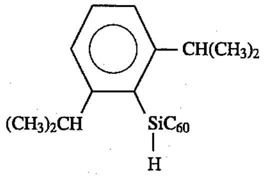

(23)

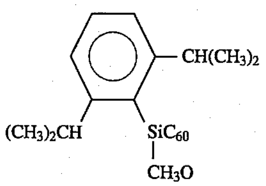

(24)

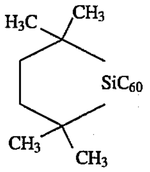

Hereinbelow, some synthesis examples of fullerene compounds according to the present invention will be described.

Synthesis Example 1 (Synthesis of Compounds 1 and 2)

$C_{60}$ (115 mg. 0.16 mmol) and Example Polysilane P-1 (80 mg, 0.16 mmol) in a toluene solution (40 ml) were placed in a quartz glass tube and, after freeze-degassing and evacuation, subjected to 1 hour of photoirradiation by using a 125 watt-low pressure mercury lamp. The color of the reaction solution was changed from violet peculiar to $C_{60}$ to dark brown. The reaction product was dissolved in a mixture solvent of toluene-hexane (1:3 by volume) and subjected to separation and purification by silica gel flash chromatography. As a result, 10 mg of unreacted $C_{60}$ was recovered, and 90 mg (yield: 58%) of Compound 1 (silylene-$C_{60}$(1:1) adduct) and 55 mg (yield: 27%) of Compound 2 (silylene-$C_{60}$ (2:1) adduct) were obtained.

Figure 1:
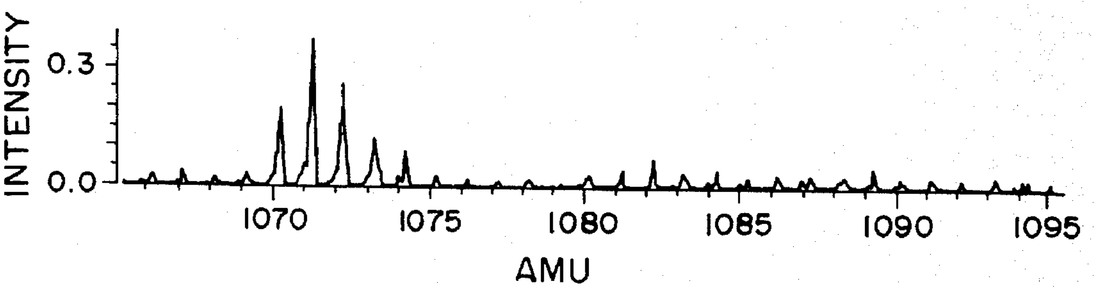
FIG. 1 shows an FAB mass spectrum of fullerene compound 1 according to the invention.
Figure 2:
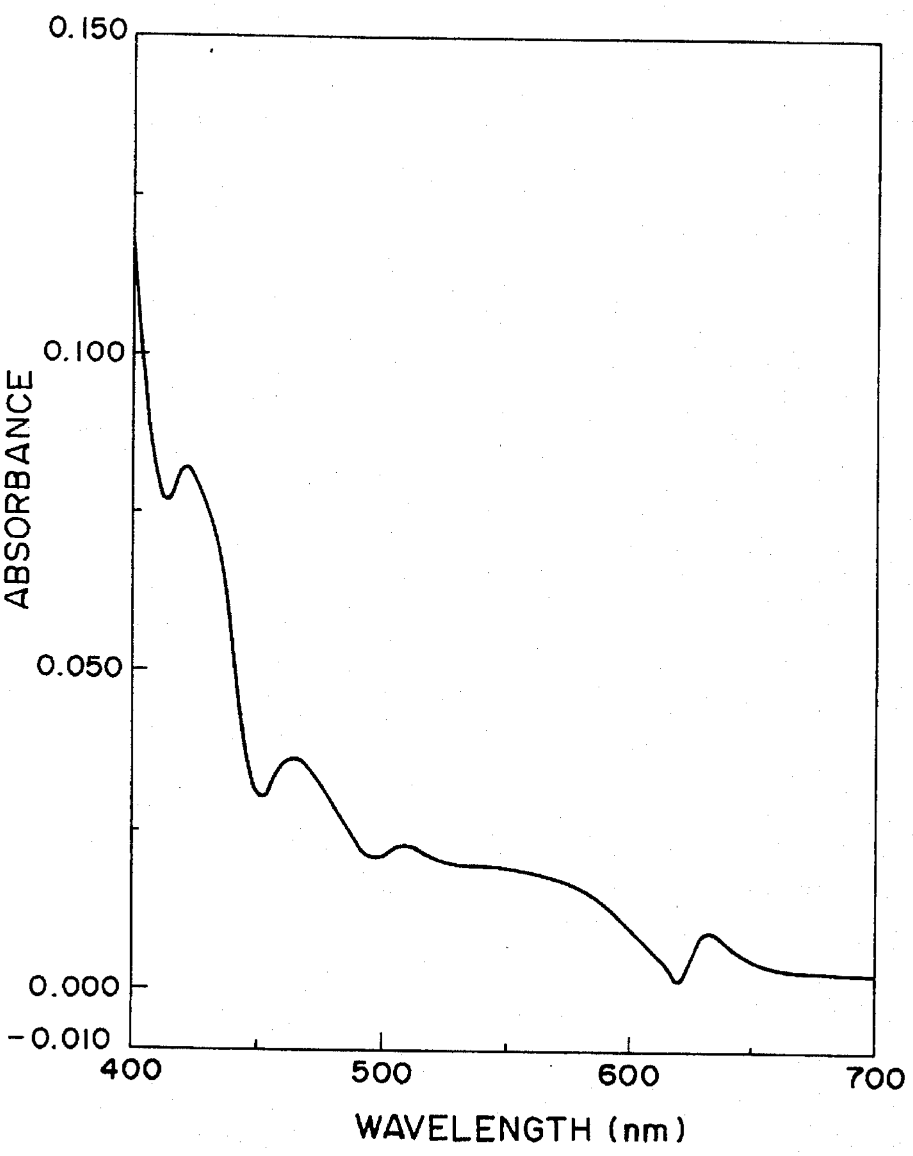
FIG. 2 shows a UV-VIS spectrum (in toluene) of fullerene compound 1 according to the invention.
Figure 3:
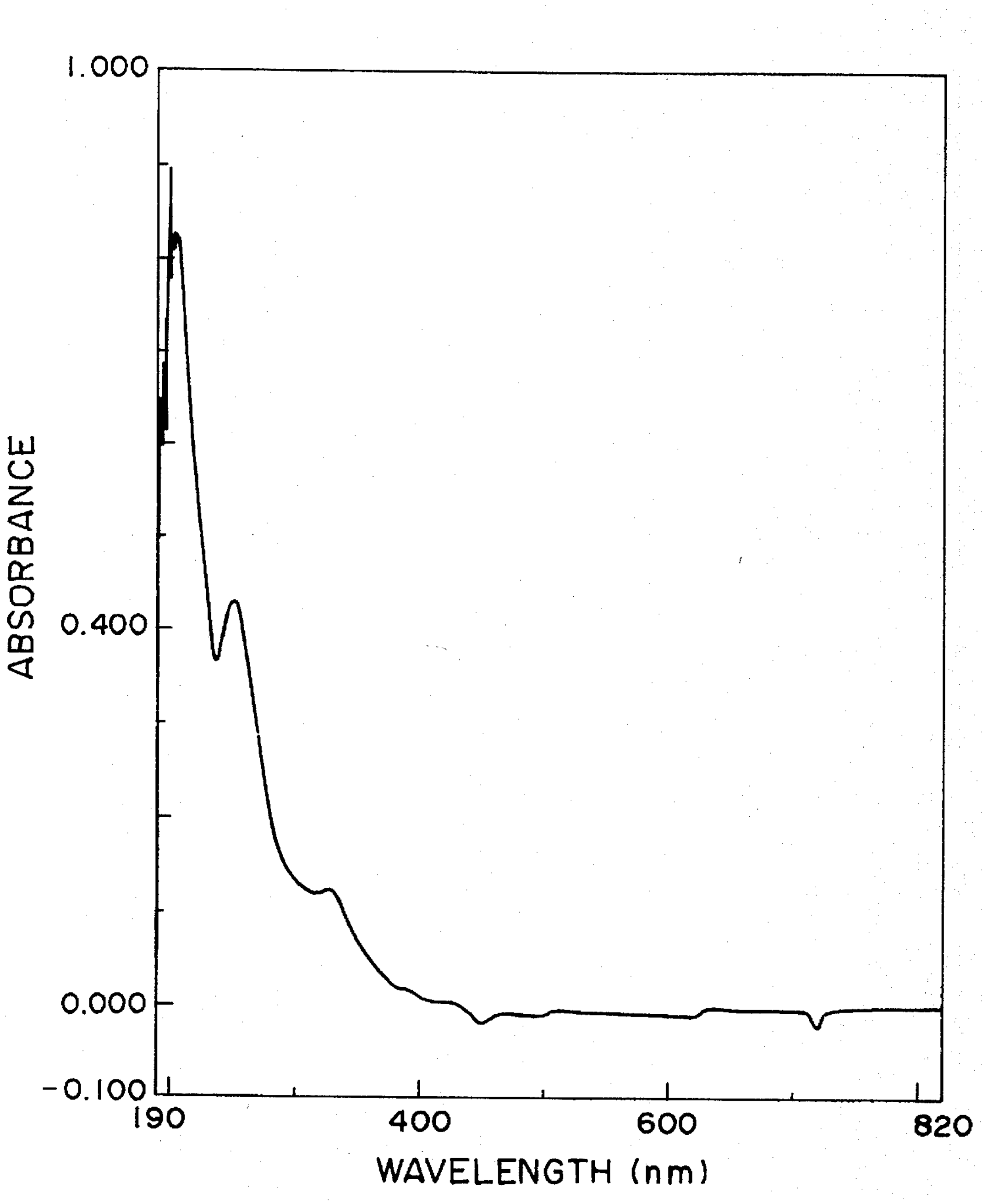
FIG. 3 shows a UV-VIS spectrum (in hexane) of fullerene compound 1 according to the invention.
Figure 4:
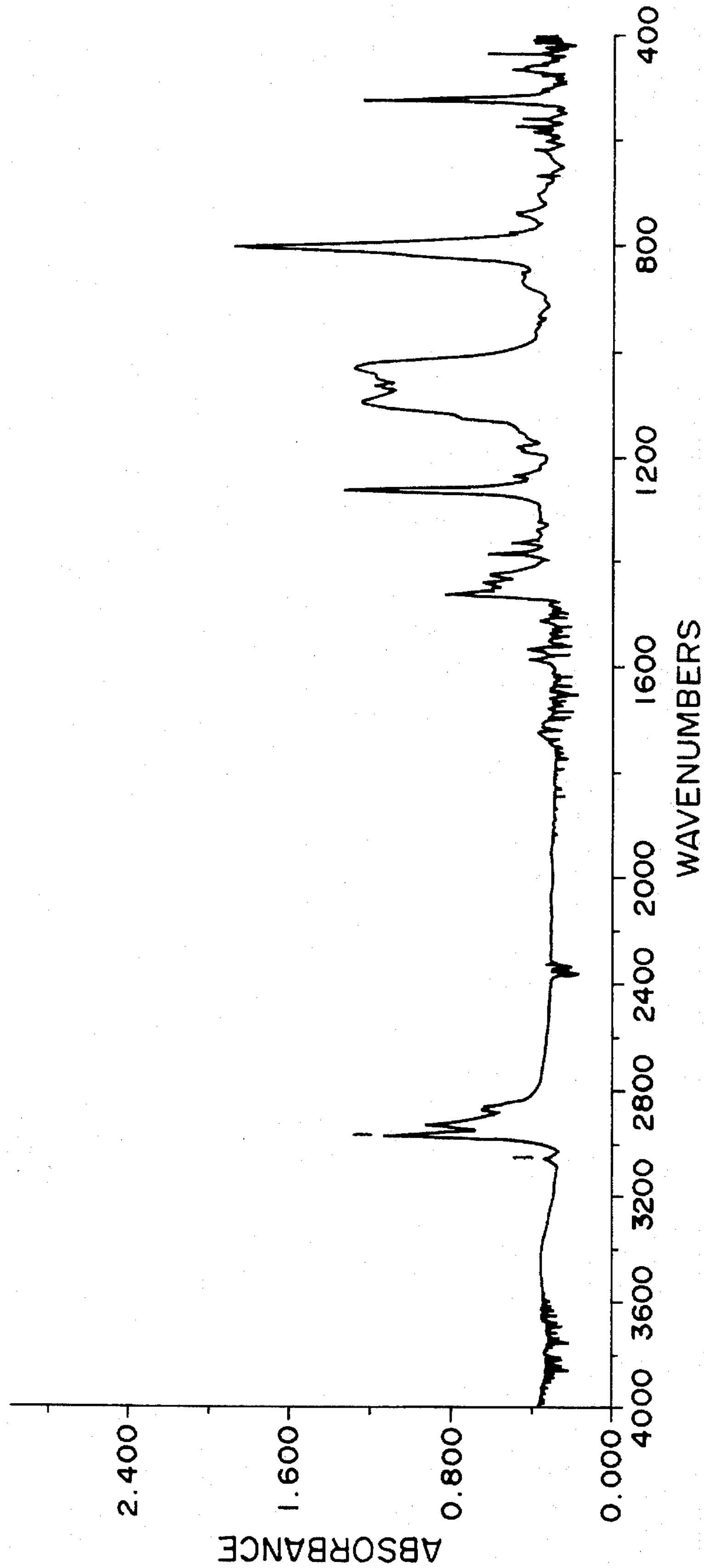
FIG. 4 shows an FT-IR spectrum (KBr pellet method) of fullerene compound 1 according to the invention.
Figure 5:
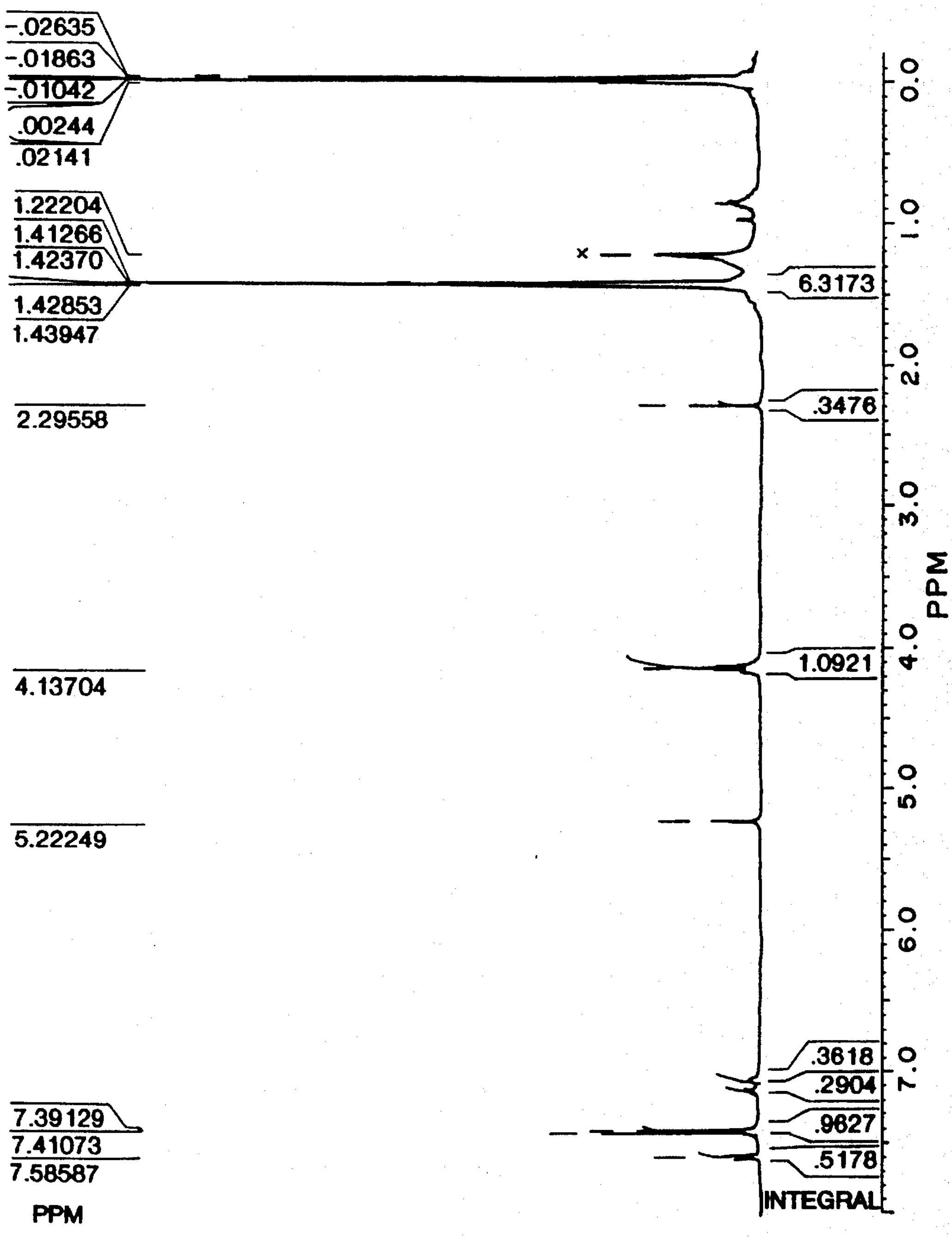
FIG. 5 shows a $^{1}$H- NMR spectrum (400 MHz) of fullerene compound 1 according to the invention.

FIG. 1 shows an FAB (fast atom bombardment) mass spectrum of Compound 1. The FAB mass spectrum of Compound 1 showed molecular ion peaks at 1074-1070 and reference peaks at 723-720, thus indicating the formation of Compound (1). Compound 1 provided UV-VIS (ultravioletvisible range) absorption spectra as shown in FIG. 2 (in toluene) and FIG. 3 (in hexane) which were similar to those of $C_{60}$ but showed a slight difference in an absorption wavelength range of 400–700 nm. More specifically, the absorptions at maximum absorption wavelengths of 539 nm and 597 nm of $C_{60}$ were weakened and absorptions at 463 and 508 nm were intensified. Compound i provided an FT-IR (Fourier transform infrared spectroscopy) spectrum (FIG. 4) which showed an absorption at 3048.7 $cm^{-1}$ attributable to an aromatic ring and an absorption at 2961.9 $cm^{-1}$ attributable to isopropyl group and showed no remarkable absorption bands at above 1500 $cm^{-1}$ except for the above. Below 1500 $cm^{-1}$, however, four absorptions (at 1429.0, 1182.9, 575.9 and 527.0 $cm^{-1}$) peculiar to $C_{60}$ were observed, and relatively strong 7 absorptions and relatively weak 8 absorptions newly appeared.

From these results, it was found that Fullerene Compound 1 according to the present invention had novel characteristics as well as the electronic and structural characteristics of $C_{60}$. The adduct structure thereof is assumed to be one of a silirane-type adduct of $C_{2v}$ symmetry formed by the addition of the silylene as shown in FIG. 8. An annulene-type adduct as shown in FIG. 9 could also arise via isomerization of the silirane-type adduct.

Figure 6:
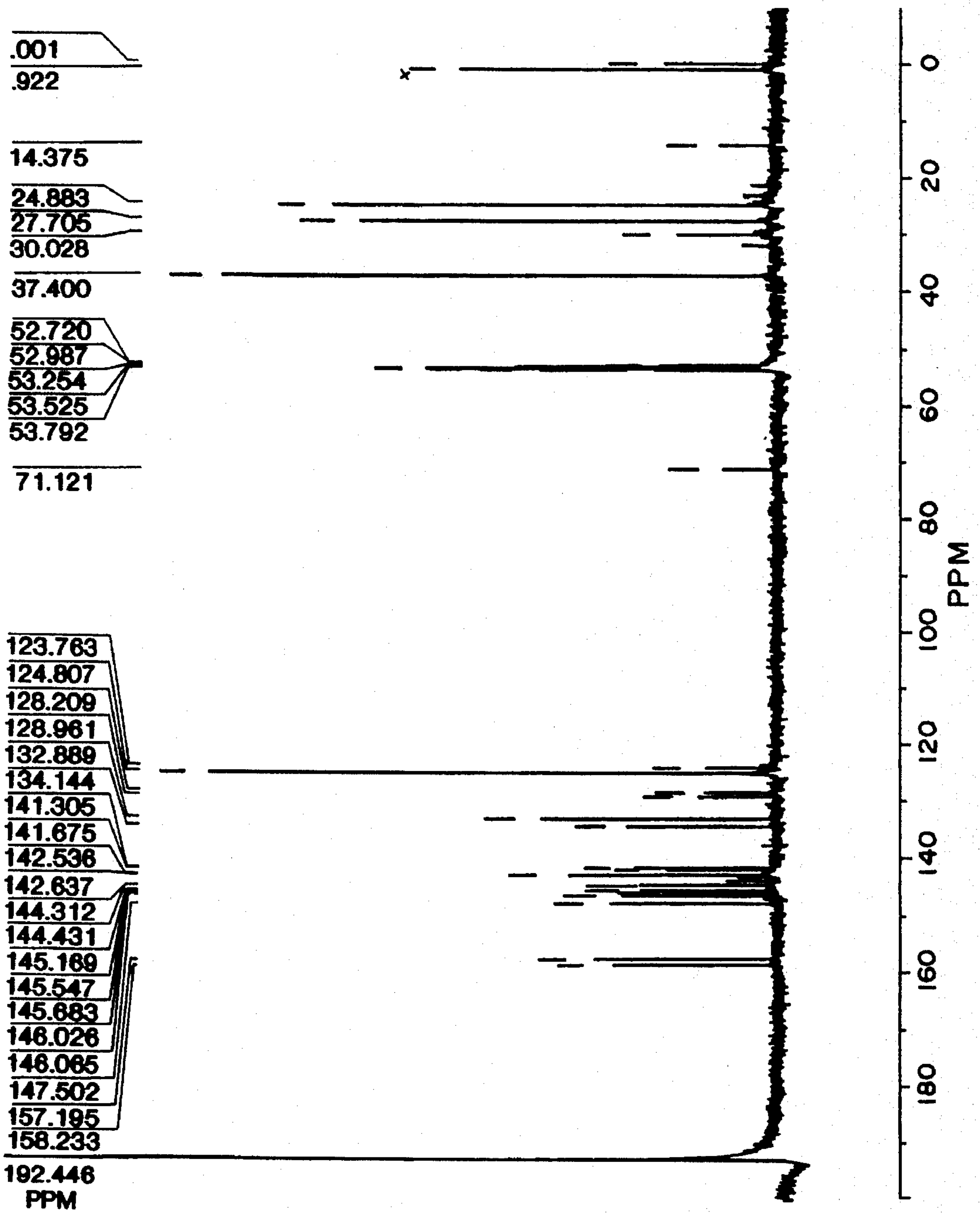
FIG. 6 shows a $^{13}$C- NMR spectrum (100 MHz) of fullerene compound 1 according to the invention.
Figure 7:
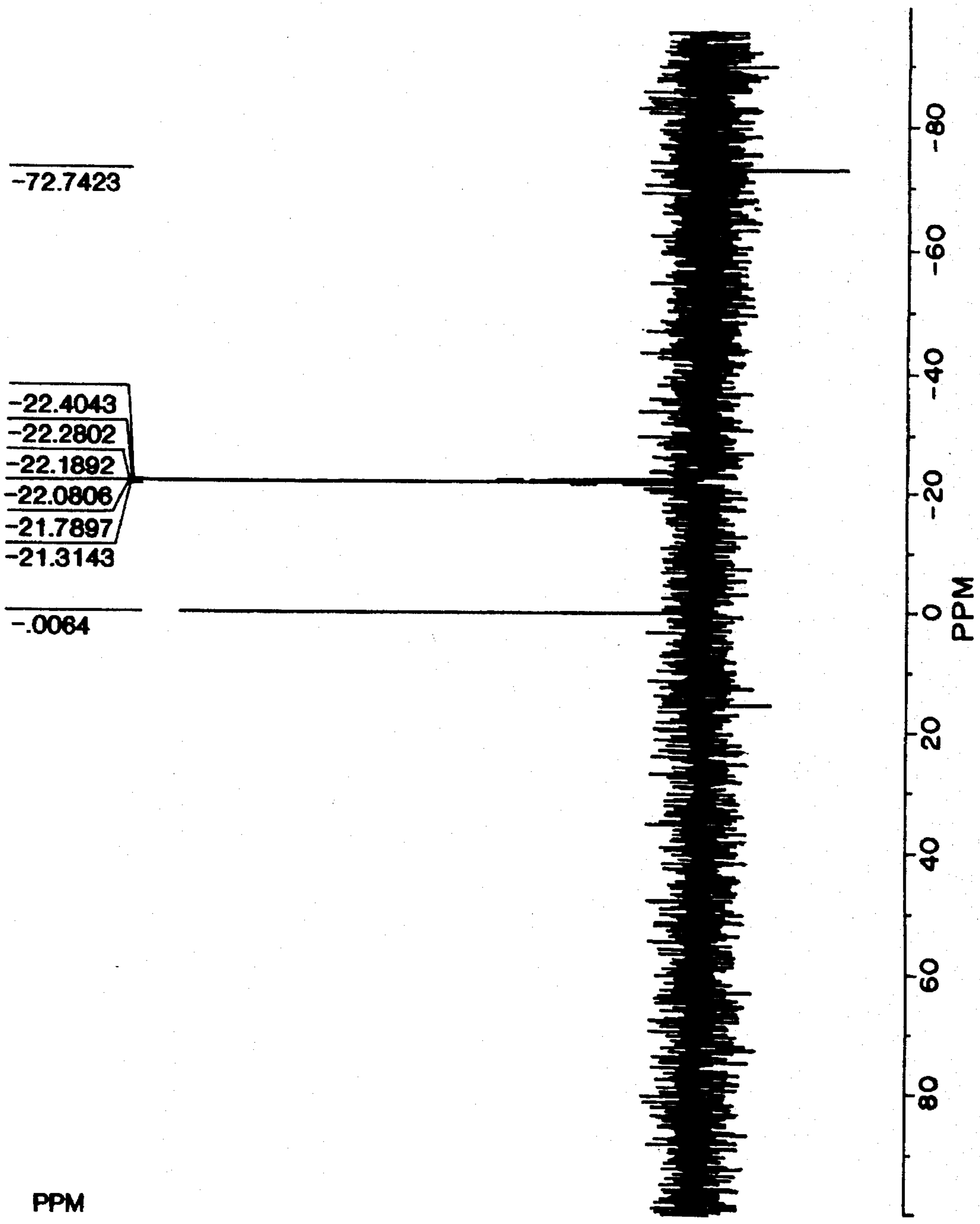
FIG. 7 shows a $^{29}$Si- NMR spectrum (79 MHz) of fullerene compound 1 according to the invention.

The $^{13}C$ NMR spectrum (FIG. 6) of Compound 1 showed 17 signals attributable to carbons in the $C_{60}$ skeleton, including 4 signals attributable to 2 carbons and 13 signals attributable to 4 carbons. More specifically, one signal appeared at 71.12 ppm and the remaining 16 lines appeared between 140 and 150 ppm. The absorption at 142.54 ppm was a superposition of three signals. These results show that Compound 1 had a $C_{2v}$ symmetry. Further, as it is assumed that an $sp^2$ carbon next to the silicon atom provides a signal at 130 ppm, the absorption at 71.12 ppm supports the silirane-type structure shown in FIG. 8 rather than the annulene-type structure shown in FIG. 9. It is generally known that the methyl-substituted carbon atom in silirane appears in the neighborhood of 15–25 ppm and on the other hand a vinyl-substitution causes a lower magnetic field shift of about 20 ppm, so that the signal at 71.12 mm was identified to be attributable to a carbon atom in the silirane ring of the silirane-type adduct. The $^{29}Si$ NMR spectrum (FIG. 7) shows a signal at −72.74 ppm which was identified to be attributable to a silicon atom in the silirane-type adduct because an aromatic ring-substituted silicon atom in silirane generally provides a signal at −50 to −85 ppm and diphenyldivinylsilane is assumed to provide a signal in the vicinity of −20 ppm.

Synthesis Example 2 (Synthesis of Compounds 1, 2 and 3)

Fullerene compounds according to the present invention were synthesized in the same manner as in Synthesis Example 1 except that 160 mg (0.32 mmol) of Example Polysilane P-1 was used, thereby to obtain Compound 1 (silylene-$C_{60}$ (1:1) adduct) at 16%, Compound 2 (silylene-$C_{60}$ (2:1) adduct) at 21%, and Compound 3 (Silylene-$C_{60}$ (3:1) adduct) at 12% of yield.

Synthesis Example 3 (Synthesis of Compounds 1, 2 and 3)

Fullerene compounds according to the present invention were synthesized in the same manner as in Synthesis Example 1 except that 240 mg (0.48 mmol) of Example Polysilane P-1 was used, thereby to obtain Compound 1 (silylene-$C_{60}$ (1:1) adduct) at a small percentage, Compound 2 (silylene-$C_{60}$ (2:1) adduct) at 14%, and Compound 3 (Silylene-$C_{60}$ (3:1) adduct) at 80% of yield.

Synthesis Example 4 (Synthesis of Compounds 1, 2, 3 and 4)

Fullerene compounds according to the present invention were synthesized in the same manner as in Synthesis Example 1 except that 2.4 g (4.8 mmol) of Example Polysilane P-1 was used, thereby to obtain Compound 1 (silylene-$C_{60}$ (1:1) adduct), Compound 2 (silylene-$C_{60}$ (2:1) adduct), Compound 3 (Silylene-$C_{60}$ (3:1) adduct) and Compound 4 (silylene-$C_{60}$ (4:1) adduct).

Synthesis Example 5 (Synthesis of Compounds 5 to 9)

Fullerene compounds according to the present invention were synthesized in the same manner as in Synthesis Example 1 except that 72 mg (0.1 mmol) of $C_{60}$ and 132 mg (3 mmol) of Example Polysilane Compound P-3 instead of P-1 were used, thereby to obtain Compound 5 (silylene-$C_{60}$ (1:1) adduct), Compound 6 (2:1 adduct), Compound 7 (3:1 adduct), Compound 8 (4:1 adduct) and Compound 9 (5:1 adduct).

Synthesis Example 6 (Synthesis of Compounds 10 to 14)

Fullerene compounds according to the present invention were synthesized in the same manner as in Synthesis Example 5 except that 115 mg (3 mmol) of Example Polysilane Compound P-2 instead of P-3 was used, thereby to obtain Compound 10 (silylene-$C_{60}$ (1:1) adduct), Compound 11 (2:1 adduct), Compound 12 (3:1 adduct), Compound 13 (4:1 adduct) and Compound 14 (5:1 adduct).

FAB mass spectrum, UV-VIS spectrum (in toluene), UV-VIS spectrum (in hexane), FT-IR spectrum (KBr method), $^1H$□ NMR spectrum (400 MHz), $^{13}C$□ NMR spectrum (100 MHz), and $^{29}C$□ NMR spectrum (79 MHz) of Compound 2 were shown in FIGS. 10–16, respectively. FAB mass spectrum, UV-VIS spectrum (in toluene), UV-VIS spectrum (in hexane), FT-IR spectrum (KBr method), $^1H$□ NMR spectrum (400 MHz), $^{13}C$□ NMR spectrum (100 MHz), and $^{29}C$□ NMR spectrum (79 MHz) of Compound 3 were shown in FIGS. 17–23, respectively. FAB mass spectra of Compounds 4–14 are shown in FIGS. 24–34, respectively.

The present invention also provides an electrophotographic photosensitive member having a photosensitive layer containing a fullerene compound as described above.

The photosensitive layer of the electrophotographic photosensitive member of the present invention may assume any of the following layer structures, for example:

(1) a lower layer containing a charge-generating material and an upper layer containing a charge-transporting material;

(2) a lower layer containing a charge-transporting material and a upper layer containing a charge-generating material; and (3) a single layer containing a charge-generating material and a charge-transporting material.

The fullerene compound used in the present invention has a high hole-transporting ability and accordingly may preferably be used as a charge-transporting material contained in the above photosensitive layer having the structure of (1), (2) or (3). A polarity of a primary charge for use in a charging step of the photosensitive member of the present invention may preferably be negative for the structure (1), positive for the structure (2), and either negative or positive for the structure (3).

The photosensitive member according to the present invention can have a layer structure other than the above-described basic structure. Incidentally, however, the photosensitive member of the present invention may preferably contain a photosensitive layer having the above-mentioned layer structure (1).

The electroconductive support constituting the present invention may for example comprise the following materials:

(i) a metal or an alloy such as aluminum, aluminum alloy, stainless steel or copper;

(ii) a laminated or vapor-deposited support comprising a non-electroconductive substance such as glass, a resin or paper, or the above support (i) each having thereon a layer of a metal or an alloy such as aluminum, aluminum alloy, palladium, rhodium, gold or platinum; and (iii) a coated or vapor-deposited support comprising a non-electroconductive substance such as glass, a resin or paper, or a support of the above-mentioned electroconductive material (i) or (ii) having thereon a layer of an electroconductive substance such as an electroconductive polymer, tin oxide or indium oxide, or a layer of such an electroconductive substance dispersed in an appropriate resin applied in solution.

The charge-generating material contained in the charge generation layer may include:

(i) azo pigments of monoazo-type, bisazo-type, trisazo-type, etc.;

(ii) phthalocyanine pigments such as metallophthalocyanine and non-metallophthalocyanine;

(iii) indigo pigments such as indigo and thioindigo;

(iv) perylene pigments such as perylenic anhydride and perylenimide;

(v) polycyclic quinones such as anthraquinone and pyrene-1,8-quinone;

(vi) squarilium colorant;

(vii) pyrylium salts and thiopyrylium salts;

(viii) triphenylmethane-type colorants; and (ix) inorganic substances such as selenium and amorphous silicon.

The above charge-generating material may be used singly or in combination of two or more species.

In the present invention, the charge generation layer may be formed on the electroconductive support by vapor-deposition, sputtering or chemical vapor deposition (CVD), or by dispersing the charge-generation material in an appropriate solution containing a binder resin and applying the resultant coating liquid onto the electroconductive support by means of a known coating method such as dipping, spinner coating, roller coating, wire bar coating, spray coating or blade coating and then drying the coating.

Examples of the binder resin used may be selected from various known resins such as a polycarbonate resin, a polyester resin, a polyarylate resin, polyvinyl butyral resin, polystyrene resin, polyvinyl acetal resin, diallylphthalate resin, acrylic resin, methacrylic resin, vinyl acetate resin, phenoxy resin, silicone resin, polysulfone resin, styrene-butadiene copolymer, alkyd resin, epoxy resin, urea resin and vinyl chloride-vinyl acetate copolymer. These binder resins may be used singly or in combination of two or more species. The charge generation layer may preferably contain at most 80 wt. %, particularly at most 40 wt. %, of the binder resin.

The charge generation layer may further contain various sensitizing agents, as desired.

The charge generation layer may preferably have a thickness of at most 5 μm, particularly 0.01 to 2 μm.

The charge transport layer according to the present invention may be formed by a combination of the fullerene compound and an appropriate binder resin.

Examples of the binder resin to be used for forming the charge transport layer may include: the resins used for the charge generation layer described above; and organic photoconductive polymers such as poly-N-vinylcarbazole and polyvinylanthracene.

The fullerene compound according to the present invention may preferably be mixed with the binder resin in a proportion of 10 to 500 wt. parts, particularly 50 to 200 wt. parts, per 100 wt. parts of the binder resin.

The charge transport layer and the charge generation layer are electrically connected to each other. Accordingly, the charge-transporting material contained in the charge transport layer has functions of receiving charge carriers generated in the charge generation layer and transporting the charge carries from the charge generation layer or charge transport layer to the surface of the photosensitive layer under electric field application.

The charge transport layer may preferably have a thickness of 5 to 40 μm, particularly 10 to 30 μm, in view of a charge-transporting ability of the charge-transporting material since the charge-transporting material fails to transport the charge carries when a thickness of the charge transport layer is too large.

The charge transport layer may contain further additives such as an antioxidant, an ultraviolet absorbing agent, and a plasticizer, as desired.

In the present invention, it is also possible to dispose an undercoating layer having a barrier function and an adhesive function between the electroconductive support and the photosensitive layer. Such an undercoating layer may be composed from casein, polyvinyl alcohol, nitrocellulose, polyamides (nylon 6, nylon 66, nylon 610, copolymer nylon, alkoxymethylated nylon), polyurethane or aluminum oxide. The undercoating layer may preferably have a thickness of at most 5 μm, particularly 0.1–3 μm.

In the present invention, it is further possible to form a protective layer comprising a resin, or a resin containing electroconductive particles or a charge-transporting material therein, on the photosensitive layer for the purpose of protecting the photosensitive layer from an external mechanical or chemical adverse influence.

The respective layers mentioned above may be formed by a coating method, such as dip coating, spray coating, spinner coating, roller coating, wire bar coating, or blade coating, The electrophotographic photosensitive member according to the present invention can be applied to not only an ordinary electrophotographic copying machine but also a facsimile machine, a laser beam printer, a light-emitting diode (LED) printer, a cathode-ray tube (CRT) printer, a liquid crystal printer, and other fields of applied electrophotography including, e.g., laser plate making.

Figure 35:
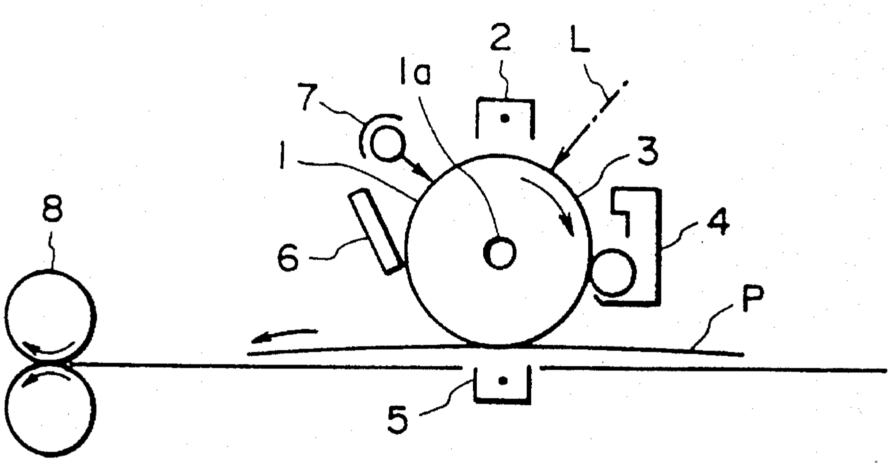
FIG. 35 is a schematic illustration an example of an electrophotographic apparatus including an electrophotographic photosensitive member according to the invention.

FIG. 35 shows a schematic structural view of an electrophotographic apparatus using an electrophotographic photosensitive member of the invention. Referring to FIG. 35, a photosensitive drum (i.e., photosensitive member) 1 as an image-carrying member is rotated about an axis la at a prescribed peripheral speed in the direction of the arrow shown inside of the photosensitive drum 1. The surface of the photosensitive drum is uniformly charged by means of a charger 2 to have a prescribed positive or negative potential. At an exposure part 3, the photosensitive drum 1 is exposed to light-image L (as by slit exposure or laser beam-scanning exposure) by using an image exposure means (not shown), whereby an electrostatic latent image corresponding to an exposure image is successively formed on the surface of the photosensitive drum 1. The electrostatic latent image is developed by a developing means 4 to form a toner image. The toner image is successively transferred to a transfer material P which is supplied from a supply part (not shown) to a position between the photosensitive drum 1 and a transfer charger 5 in synchronism with the rotating speed of the photosensitive drum 1, by means of the transfer charger 5. The transfer material P with the toner image thereon is separated from the photosensitive drum 1 to be conveyed to a fixing device 8, followed by image fixing to print out the transfer material P as a copy outside the electrophotographic apparatus. Residual toner particles on the surface of the photosensitive drum 1 after the transfer are removed by means of a cleaner 6 to provide a cleaned surface, and residual charge on the surface of the photosensitive drum 1 is erased by a pre-exposure means 7 to prepare for the next cycle.

According to the present invention, in the electrophotographic apparatus, it is possible to provide a device unit which includes plural means inclusive of or selected from the photosensitive member (photosensitive drum), the charger, the developing means, the cleaner, etc. so as to be attached or removed as desired with respect to an apparatus body. The device unit may, for example, be composed of the photosensitive member and at least one device of the charger, the developing means and the cleaner to prepare a single unit capable of being attached to or removed from the body of the electrophotographic apparatus by using a guiding means such as a rail in the body.

In case where the electrophotographic apparatus is used as a copying machine or a printer, exposure light-image L may be given by reading a data on reflection light or transmitted light from an original or reading on the original by means of a sensor, converting the data into a signal and then effecting a laser beam scanning, a drive of LED array or a drive of a liquid crystal shutter array so as to expose the photosensitive member with the light-image L.

Figure 36:
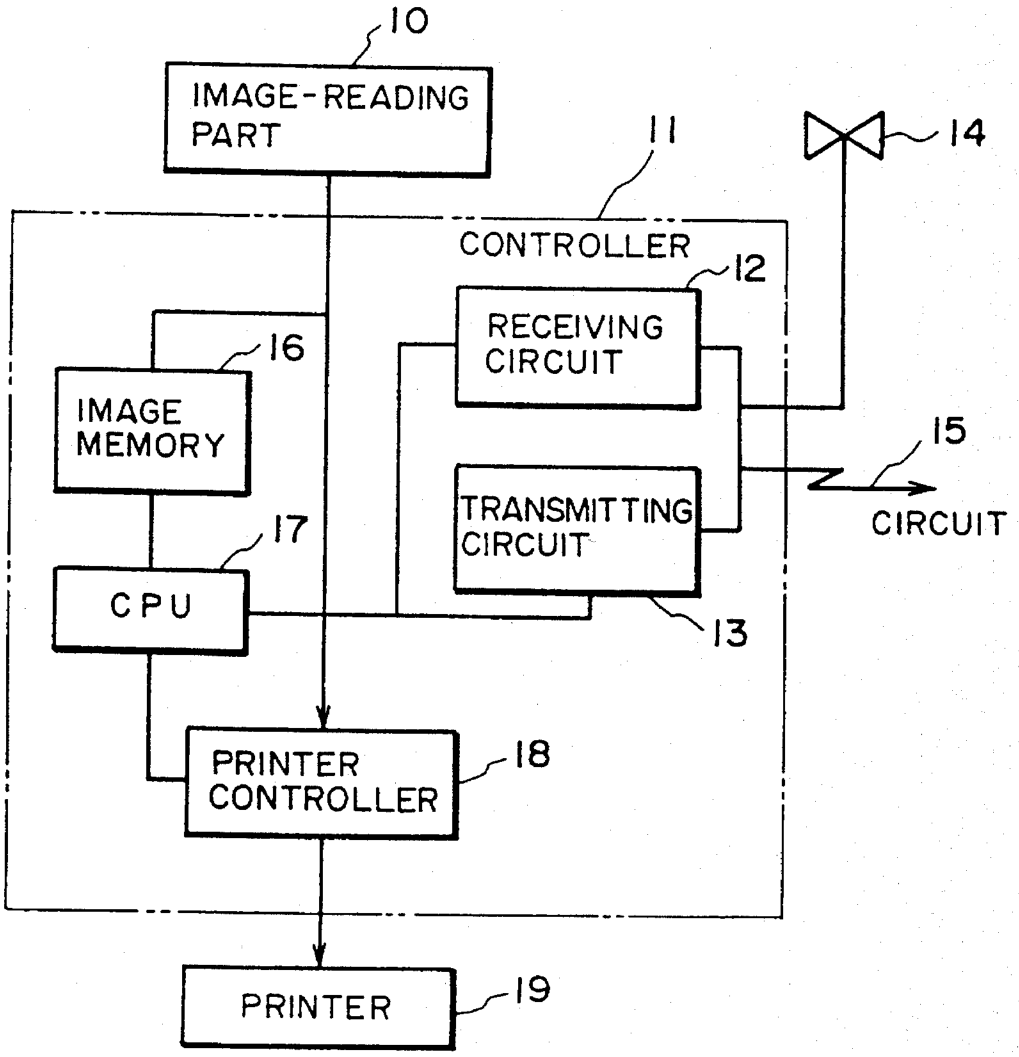
FIG. 36 is a block diagram of an example of a facsimile apparatus including an electrophotographic photosensitive member according to the invention.

In case where the electrophotographic apparatus according to the present invention is used as a printer of a facsimile machine, exposure light-image L is given by exposure for printing received data. FIG. 36 shows a block diagram of an embodiment for explaining this case. Referring to FIG. 36, a controller 11 controls an image-reading part 10 and a printer 19. The whole controller 11 is controlled by a CPU (central processing unit) 17. Read data from the image-reading part is transmitted to a partner station through a transmitting circuit 13, and on the other hand, the received data from the partner station is sent to the printer 19 through a receiving circuit 12. An image memory 16 memorizes prescribed image data. A printer controller 18 controls the printer 19, and a reference numeral 14 denotes a telephone handset.

The image received through a circuit 15 (the image data sent through the circuit from a connected remote terminal) is demodulated by means of the receiving circuit 12 and successively stored in an image memory 16 after a restoring-signal processing of the image data. When image for at least one page is stored in the image memory 16, image recording of the page is effected. The CPU 17 reads out the image data for one page from the image memory 16 and sends the image data for one page subjected to the restoring-signal processing to the printer controller 18. The printer controller 18 receives the image data for one page from the CPU 17 and controls the printer 19 in order to effect image-data recording. Further, the CPU 17 is caused to receive image for a subsequent page during the recording by the printer 19. As described above, the receiving and recording of the image are performed.

Hereinbelow, some examples will be described regarding the production and evaluation of the photosensitive members.

EXAMPLE 1

A coating liquid for a charge generation layer (CGL) was prepared by adding 5 g of a bisazo pigment of the formula:

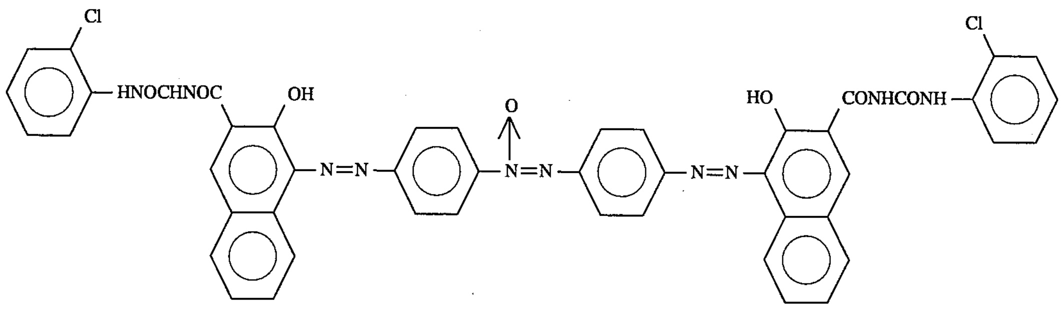

to a solution of 2 g of a butyral resin (butyral degree of 69 mol. %, weight-average molecular weight (Mw) of 35,000) in 95 ml of cyclohexanone, followed by dispersion for 36 hours by means of a sand mill.

The coating liquid for the CGL was applied onto an aluminum sheet by a wire bar and dried to obtain a 0.2 μm-thick CGL.

Then, 5 g of Fullerene Compound (1) described before as a charge-transporting material and 5 g of a polycarbonate resin Mw=20,000 were dissolved in 80 g of mono-chlorobenzene to prepare a coating liquid.

The coating liquid was applied onto the above-prepared CGL by means of a wire bar, followed by drying to form a charge transport layer (CTL) having a thickness of 20 μm, whereby an electrophotographic photosensitive member was prepared.

The thus prepared photosensitive member was negatively charged by using corona (−5 KV) according to a static method by means of an electrostatic copying paper tester (Model: SP-428, mfd. by Kawaguchi Denki K. K.) and retained in a dark place for 1 sec. Thereafter, the photosensitive member was exposed to light at an illuminance of 20 lux to evaluate charging characteristics. More specifically, the charging characteristics were evaluated by measuring a surface potential ($V_0$) at an initial stage, a surface potential ($V_1$) obtained after a dark decay for 1 sec, and the exposure quantity ($E_{1/5}$: lux.sec) (i.e., sensitivity) required for decreasing the potential $V_1$ to ⅕ thereof.

In order to evaluate the potential characteristic in a commercial copying machine, an electrophotographic photosensitive member was prepared in the same manner as above except that the photosensitive layer was formed on an aluminum cylinder (80 mm dia.×360 mm) instead of the aluminum sheet by dip coating and loaded in a commercially available plain paper copier ("NP-3825", mfd. by Canon K. K.) and subjected to a copying test of 30,000 sheets so as to evaluate the dark part potential ($V_D$) and the light part potential ($V_L$) at an initial stage and after 30,000 sheets on condition that $V_D$ and $V_L$ at the initial stage were set to −700 V and −200 V, respectively. The resultant images were also evaluated by eyes. The results are shown in Table 1 appearing hereinafter.

EXAMPLES 2–10

Electrophotographic photosensitive members were prepared and evaluated in the same manner as in Example 1 except that a bisazopigment of the following formula was used as the charge-generating material and fullerene compounds shown (by Example Compound Nos. indicated before) in Table 1 were respectively used as the charge-transporting materials.

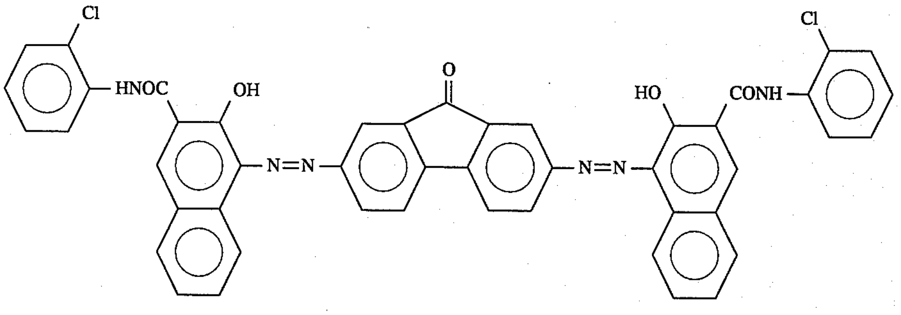

The results are also shown in Table 1.

Comparative Example 1

An electrophotographic photosensitive member was prepared and evaluated in the same manner as in Example 2 except that Buckminsterfullerene ($C_{60}$) was used as the charge-transporting material. The results are shown in Table 1 below.

TABLE 1

| | Example Compound No. | $V_0$ (−V) | $V_1$ (−V) | $E_{1/5}$ (lux · sec) | Initial stage $V_D$ (−V) | Initial stage $V_L$ (−V) | After 30000 sheets $V_D$ (−V) | After 30000 sheets $V_L$ (−V) | Image evaluation |
|---|---|---|---|---|---|---|---|---|---|
| Ex. 1 | 1 | 705 | 700 | 1.8 | 700 | 200 | 695 | 200 | *1 |
| 2 | 2 | 705 | 700 | 2.0 | 700 | 200 | 695 | 200 | *1 |
| 3 | 3 | 700 | 695 | 2.2 | 700 | 200 | 690 | 200 | *1 |
| 4 | 4 | 700 | 695 | 2.1 | 700 | 200 | 690 | 200 | *1 |
| 5 | 5 | 705 | 695 | 2.0 | 700 | 200 | 695 | 205 | *1 |
| 6 | 7 | 700 | 695 | 2.2 | 700 | 200 | 690 | 200 | *1 |
| 7 | 10 | 700 | 695 | 2.0 | 700 | 200 | 695 | 205 | *1 |
| 8 | 11 | 705 | 700 | 2.1 | 700 | 200 | 700 | 205 | *1 |
| 9 | 14 | 700 | 695 | 2.2 | 700 | 200 | 690 | 200 | *1 |
| 10 | 15 | 700 | 695 | 2.1 | 700 | 200 | 690 | 200 | *1 |
| Comp. Ex. 1 | — | 700 | 690 | 2.5 | 700 | 200 | 670 | 250 | *2 |

*1: Clear images faithful to the original were obtained up to 30,000 sheets.
*2: Images were blurred after about 20,000 sheets

EXAMPLE 11

Onto an aluminum substrate, a solution of 4 g of an N-methoxymethylated 6-nylon resin (Mw=32,000) and 10 g of an alcohol-soluble copolymer nylon resin (Mw=29,000) in 100 g of methanol was applied by means of a wire bar, followed by drying to form a 1 μm-thick undercoating layer.

Separately, 10 g of oxytitanium phthalocyanine was added to a solution of 5 g of polyvinyl butyral resin (butyral degree=68%, Mw=35,000) in 90 g of dioxane and the resultant mixture was dispersed for 24 hours in a ball mill. The liquid dispersion was applied onto the undercoating layer by blade coating, followed by drying to form a 0.3μ-thick CGL.

Then, 7 g of Fullerene Compound (1) described before and 10 g of polymethyl methacrylate resin (Mw=45,000) were dissolved in 70 g of monochlorobenzene. The solution was applied onto the CGL by blade coating and dried to form a 25 μm-thick CTL to prepare an electrophotographic photosensitive member.

The thus prepared photosensitive member was charged by corona discharge (−5 KV) so as to have an initial potential of $V_0$, left standing in a dark place for 1 sec, and thereafter the surface potential thereof ($V_1$) was measured. In order to evaluate the photosensitivity, the exposure quantity ($E_{1/5}$, μJ/cm$^2$) required for decreasing the potential $V_1$ after the dark decay to ⅕ thereof was measured. The light source used herein was laser light (output: 5 mW, emission wavelength: 780 nm) emitted from a ternary semiconductor comprising gallium/aluminum/arsenic.

Then, a photosensitive member was prepared in the same manner as above except that the photosensitive layer was formed by dip coating on an aluminum cylinder (60 mm dia.×258 mm) instead of the aluminum sheet by dip coating. The photosensitive member was loaded in a commercially available laser beam printer ("LBP-EX", mfd. by Canon K. K.) of the reversal development-type equipped with a semiconductor laser similar to the above, and subjected to a repetitive printing test of 5,000 sheets to evaluate the potential characteristics.

The image formation conditions used herein were as follows:

| | |
|---|---|
| surface potential after primary charging (VD): | −700 V |
| surface potential after image exposure (VL): (exposure quantity: 0.22 μj/$cm^2$) | −170 V |
| transfer potential: | +700 V |
| polarity of developing: | negative |
| process speed: | 50 mm/sec |
| developing condition (developing bias): | −450 V |
| image exposure scanning system | |

The results are shown in Table 2 appearing hereinafter.

EXAMPLES 12 TO 18

Electrophotographic photosensitive members were prepared and evaluated in the same manner as in Example 11 except for using Example Compound (fullerene compound) shown in Table 2.

The results are shown in the following Table 2.

TABLE 2

| | Example Compound No. | $V_0$ (−V) | $V_1$ (−V) | $E_{1/5}$ (uJ/$cm^2$) | Initial stage $V_D$ (−V) | Initial stage $V_L$ (−V) | After 50000 sheets $V_D$ (−V) | After 50000 sheets $V_L$ (−V) | Image evaluation |
|---|---|---|---|---|---|---|---|---|---|
| Ex. 11 | 1 | 750 | 745 | 0.21 | 700 | 170 | 695 | 170 | *3 |
| 12 | 2 | 750 | 745 | 0.22 | 700 | 170 | 695 | 170 | *3 |
| 13 | 3 | 755 | 750 | 0.23 | 700 | 170 | 695 | 175 | *3 |
| 14 | 4 | 750 | 750 | 0.21 | 700 | 170 | 695 | 170 | *3 |
| 15 | 5 | 750 | 745 | 0.22 | 700 | 170 | 695 | 175 | *3 |
| 16 | 8 | 745 | 740 | 0.21 | 700 | 170 | 695 | 170 | *3 |
| 17 | 12 | 750 | 750 | 0.22 | 700 | 170 | 695 | 170 | *3 |
| 18 | 16 | 750 | 750 | 0.21 | 700 | 170 | 695 | 175 | *3 |

*3: Clear images faithful to the original were obtained up to 5,000 sheets.

What is claimed is:

1. A fullerene compound having a organosilicon group divalently bonded thereto.

2. A compound according to claim 1 including a fullerene structure unit showing a polyhedral structure.

3. A compound according to claim 2, including a fullerene structure unit showing a Buckminsterfullerene ($C_{60}$) structure.

4. A compound according to claim 1, wherein said organosilicon group is one represented by the following formula (1):

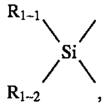

(1)

, wherein $R_{1-1}$ and $R_{1-2}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, a halogen atom, or a group constituting a substituted or unsubstituted ring by a mutual combination of $R_{1-1}$ and $R_{1-2}$ together with the Si atom in the formula.

5. A compound according to claim 4, wherein the fullerene compound is represented by the following formula (2):

$$C_{60}\text{-}(A)_n, \quad (2)$$

wherein A denotes a divalent organosilicon group represented by the formula (1), is an integer of 1 to 5, and a plurality of A in the case of n being two or larger can be the same or different with each other.

6. A process for producing a fullerene compound having an organosilicon group, comprising reacting a starting fullerene compound with a silylene.

7. A process according to claim 6, wherein said starting fullerene compound has a polyhedral structure.

8. A process according to claim 7, wherein said starting fullerene compound is a Buckminsterfullerene ($C_{60}$).

9. A process according to claim 6, wherein said silylene is one represented by the following formula (3):

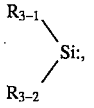

(3)

wherein $R_{3-1}$ and $R_{3-2}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, a halogen atom, or a group constituting a substituted or unsubstituted ring by a mutual combination of $R_{3-1}$ and $R_{3-2}$ together with the Si atom in the formula.

10. A process according to claim 9, wherein said silylene is obtained by photodecomposition, thermal decomposition or reduction of a silane compound, or photodecomposition or thermal decomposition of a 7-silanorbornadiene derivative.

11. A process according to claim 10, wherein said silane compound is represented by the following formula (4), (5) or (6), and the 7-silanorbornadiene is represented by the formula (7) below:

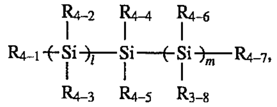

(4)

wherein $R_{4-1}$ to $R_{4-8}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, a halogen atom, or a group constituting a substituted or unsubstituted ring by a mutual combination of two of $R_{4-1}$ to $R_{4-8}$ together with the Si atom in the formula; and l and m are independently 0 or an integer satisfying $l+m \geqq 1$;

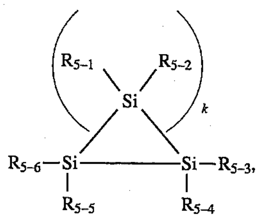

(5)

wherein $R_{5-1}$ to $R_{5-4}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, a halogen atom, or a group constituting a substituted or unsubstituted ring by a mutual combination of two of $R_{5-1}$ to $R_{5-6}$ together with the Si atom in the formula; and k is an integer of at least 1;

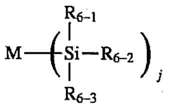

(6)

wherein M denotes a metal atoms, $R_{6-1}$ to $R_{6-3}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, a halogen atom, or a group constituting a substituted or unsubstituted ring by a mutual combination of two of $R_{6-1}$ to $R_{6-3}$ together with the Si atom in the formula; and j is an integer of 1 to 5; and

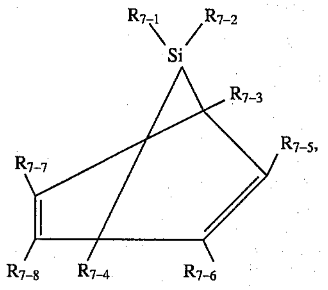

(7)

wherein $R_{7-1}$ and $R_{7-2}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, a halogen atom, or a group constituting a substituted or unsubstituted ring by a mutual combination of $R_{7-1}$ and $R_{7-2}$ together with the Si atom in the formula; $R_{7-3}$ to $R_{7-8}$ independently denote a hydrogen atom, a substituted or unsubstituted alkyl group, a substituted or unsubstituted aryl group, a substituted or unsubstituted alkoxy group, a substituted or unsubstituted silyl group, a substituted or unsubstituted germyl group, substituted or unsubstituted ester group, a halogen atom, or a group constituting a substituted or unsubstituted ring by a mutual combination of $R_{7-5}$ and $R_{7-6}$ or $R_{7-7}$ and $R_{7-8}$ together with the Si atom in the formula.

12. A process according to claim 11, wherein said silylene is obtained by photodecomposition, thermal decomposition or reduction of a silane compound represented by the formula (4).

13. A process according to claim 11, wherein said silylene is obtained by photodecomposition, thermal decomposition or reduction of a silane compound represented by the formula (5).

14. A process according to claim 11, wherein said silylene is obtained by photodecomposition, thermal decomposition or reduction of a silane compound represented by the formula (6).

15. A process according to claim 11, wherein said silylene is obtained by photodecomposition or thermal decomposition of a 7-silanorbornadiene compound represented by the formula (7).

* * * * *

UNITED STATES PATENT AND TRADEMARK OFFICE

CERTIFICATE OF CORRECTION

PATENT NO. : 5,621,130 Page 1 of 4

DATED : April 15, 1997

INVENTOR(S) : WATARU ANDO ET AL.

It is certified that error appears in the above-identified patent and that said Letters Patent is hereby corrected as shown below:

On title page, item

[54] TITLE

"ELETROPHOTOGRAPHIC" should read --ELECTROPHOTOGRAPHIC--.

[75] INVENTORS

"Hajime Miyazaki; Yokohama," should be deleted.

[56] REFERENCES CITED

Other Publications
Under "Suzuki et al.,": "(phenyl-fulleroids:"" should read --(phenyl-fulleroids)-- and under "Hawkins et al.": "Osymlated" should read --Osmylated--.

COLUMN 1

Line 3, "ELETROPHOTOGRAPHIC" should read --ELECTROPHOTOGRAPHIC--.

COLUMN 3

Line 66, "(400," should read --(400--.

UNITED STATES PATENT AND TRADEMARK OFFICE

CERTIFICATE OF CORRECTION

PATENT NO. : 5,621,130

DATED : April 15, 1997

INVENTOR(S) : WATARU ANDO ET AL. Page 2 of 4

It is certified that error appears in the above-identified patent and that said Letters Patent is hereby corrected as shown below:

COLUMN 4

Line 29, "illustration" should read --illustration of--.
Line 44, "FIG. 8." should read --FIG. 8. The fullerene compound of the present invention is characterized by the presence of two bonds between the Si atom and the fullerene skeleton as shown in FIGS. 8 and 9.--
Line 66, "wherein" should read --wherein A--.

COLUMN 5

Line 64, "$R_{5-1}$ and $R_{5-2}$" should read --$R_{5-1}$ and $R_{5-6}$--.

COLUMN 15

Line 7, "Compound i" should read --Compound 1--.

COLUMN 16

Line 40, "$^{29}$C□" should read --$^{29}$Si□--.
Line 45, "$^{29}$C□" should read --$^{29}$Si□--.

COLUMN 18

Line 22, "carries" should read --carriers--.
Line 28, "carries" should read --carriers--.

UNITED STATES PATENT AND TRADEMARK OFFICE

CERTIFICATE OF CORRECTION

PATENT NO. : 5,621,130

DATED : April 15, 1997

INVENTOR(S) : WATARU ANDO ET AL.

It is certified that error appears in the above-identified patent and that said Letters Patent is hereby corrected as shown below:

COLUMN 21

Line 14, "bisazopigment" should read --bisazo pigment--.

COLUMN 23

Table 2, "50000 sheets" should read --5000 sheets-- and
"745
745" should read --750
745--.

Line 45, "a" should read --an--.
Line 48, "claim 1" should read --claim 1,--.

COLUMN 24

Line 14, "is" should read --n is--.

COLUMN 25

Line 9, "$\underset{R_{3-8}}{|}$ " should read --$\underset{R_{4-8}}{|}$ --.

Line 29, "$R_{5-4}$" should read --$R_{5-6}$--.
Line 43, "atoms," should read --atom,--.

UNITED STATES PATENT AND TRADEMARK OFFICE
CERTIFICATE OF CORRECTION

PATENT NO. : 5,621,130

DATED : April 15, 1997

INVENTOR(S) : WATARU ANDO ET AL.

It is certified that error appears in the above-identified patent and that said Letters Patent is hereby corrected as shown below:

COLUMN 26

Line 27, "substituted" should read --a substituted--.

Signed and Sealed this

Twenty-fourth Day of March, 1998

Attest:

BRUCE LEHMAN

*Attesting Officer*

*Commissioner of Patents and Trademarks*